(12) United States Patent
Jain et al.

(10) Patent No.: US 12,710,843 B2
(45) Date of Patent: Aug. 18, 2026

(54) TOUCH SENSING ARCHITECTURE FOR SMALL FORM FACTORS

(71) Applicant: Apple Inc., Cupertino, CA (US)

(72) Inventors: Karan S. Jain, San Jose, CA (US); Nandita Venugopal, San Francisco, CA (US); Santosh Pokhrel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/830,448

(22) Filed: Sep. 10, 2024

(65) Prior Publication Data

US 2025/0103163 A1 Mar. 27, 2025

Related U.S. Application Data

(60) Provisional application No. 63/585,367, filed on Sep. 26, 2023.

(51) Int. Cl.
*G06F 3/041* (2006.01)
*G06F 3/044* (2006.01)

(52) U.S. Cl.
CPC ...... *G06F 3/041662* (2019.05); *G06F 3/0418* (2013.01); *G06F 3/0443* (2019.05); *G06F 3/0446* (2019.05); *G06F 2203/04104* (2013.01); *G06F 2203/04108* (2013.01)

(58) Field of Classification Search
CPC ............ G06F 3/041662; G06F 3/0418; G06F 3/0443; G06F 3/0446; G06F 2203/04104; G06F 2203/04108; G06F 3/0445
See application file for complete search history.

(56) References Cited

U.S. PATENT DOCUMENTS 9,389,258 B2 7/2016 Kravets et al.
11,112,922 B2 9/2021 McCulloch et al.
2009/0322702 A1* 12/2009 Chien .................. G06F 3/0445 345/174
2012/0113047 A1* 5/2012 Hanauer ............... G06F 3/0446 345/174
2013/0100066 A1* 4/2013 Doorenbos ........... G06F 3/0443 345/174

(Continued)

FOREIGN PATENT DOCUMENTS

CN 115857719 A 3/2023

*Primary Examiner* — Md Saiful A Siddiqui
(74) *Attorney, Agent, or Firm* — Kubota & Basol LLP

(57) ABSTRACT

A touch sensor panel operable within small form factor devices utilizes a plurality of discrete column electrodes arranged in a plurality of columns, and a plurality of continuous row electrodes arranged in a plurality of rows. Each column is divided into a plurality of regions, with each region formed from a plurality of electrically connected discrete column electrodes within that column. A scan plan includes a series of mutual capacitance scans wherein discrete column electrode(s) in all regions in all columns are sequentially stimulated, and AC signals indicative of mutual capacitance at certain the continuous row electrode(s) is measured. The scan plan includes a series of projection self-capacitance scans, wherein AC signals indicative of self-capacitance at a plurality of continuous row electrodes is measured for all rows, and AC signals indicative of self-capacitance at the discrete column electrodes in each region of all columns is measured.

19 Claims, 12 Drawing Sheets

(56) References Cited

U.S. PATENT DOCUMENTS

2015/0091859 A1* 4/2015 Rosenberg ............ G06F 3/0446
345/174
2015/0378498 A1* 12/2015 Huie ....................... G06F 1/169
345/174
2016/0092019 A1* 3/2016 Huang .................. G06F 3/0443
345/174
2017/0185197 A1* 6/2017 Shepelev .............. G06F 3/0446
2018/0181251 A1* 6/2018 Bolender .......... G06F 3/041661
2018/0217694 A1* 8/2018 Zhang ................... G06F 3/0412
2018/0307337 A1* 10/2018 Ahn ........................ G06F 3/044
2019/0101998 A1* 4/2019 Peng ................... G02F 1/13338
2020/0103993 A1* 4/2020 Krah ................... G06F 3/04182
2021/0019018 A1* 1/2021 Guo ....................... H10N 30/50

* cited by examiner

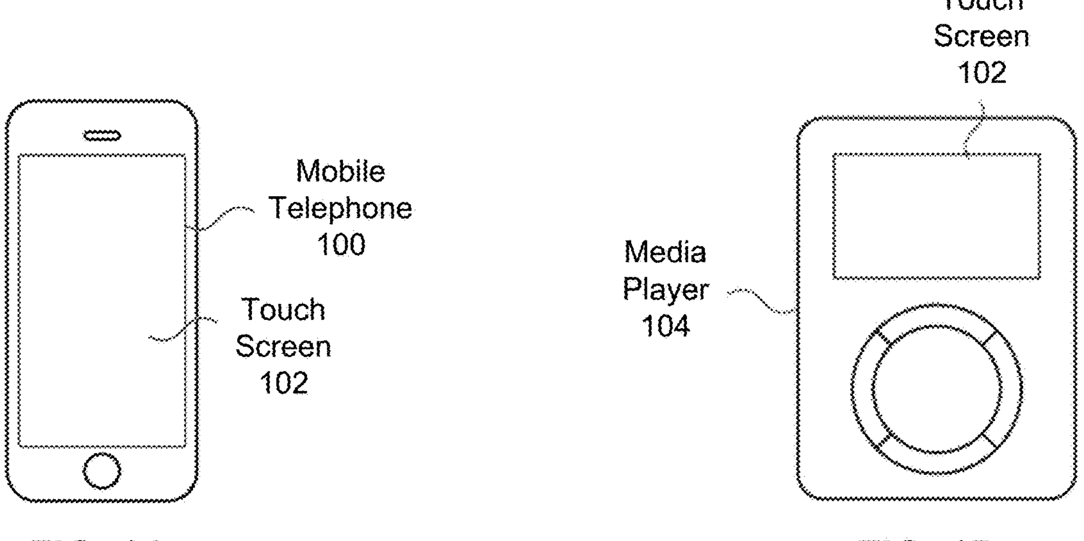
FIG. 1A
FIG. 1B
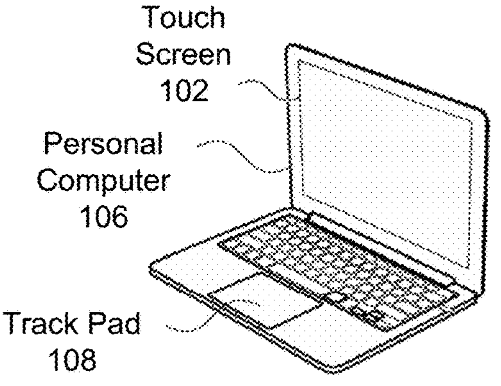
FIG. 1C
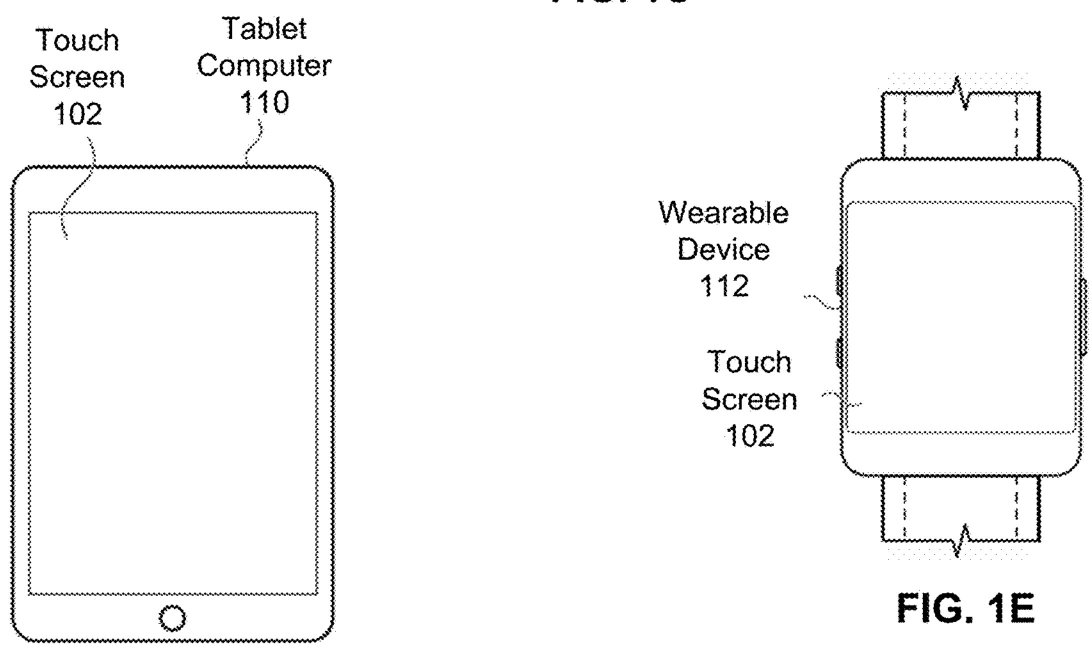
FIG. 1E
FIG. 1D

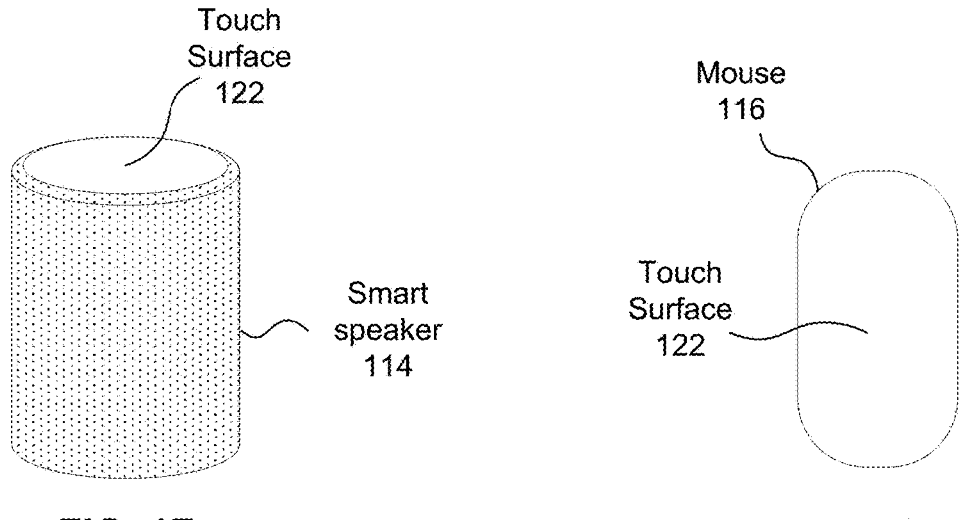
FIG. 1F
FIG. 1G
Stylus
124
Touch
Surface
122
FIG. 1H
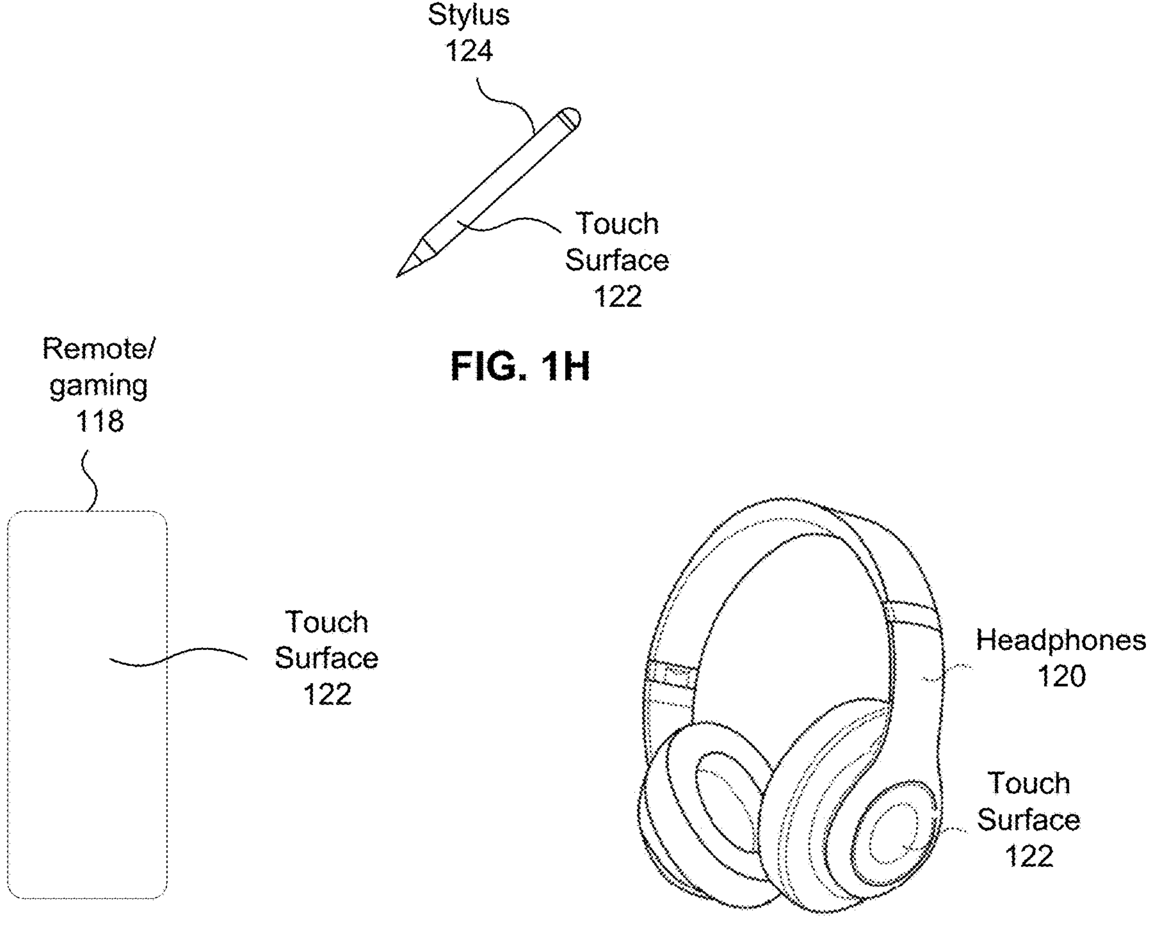
FIG. 1I
FIG. 1J

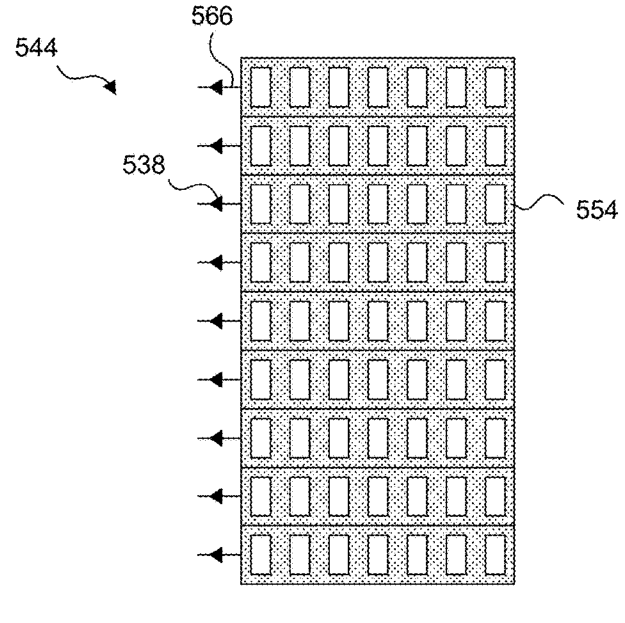
FIG. 5A
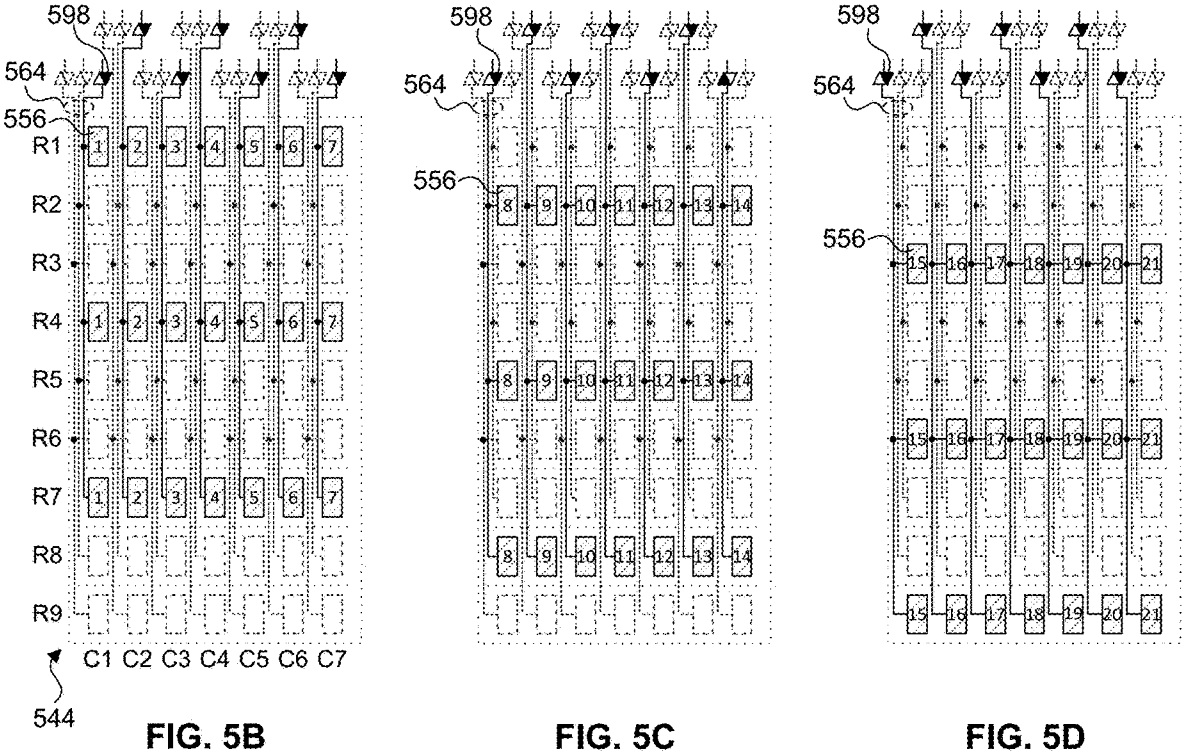
FIG. 5B
FIG. 5C
FIG. 5D

TOUCH SENSING ARCHITECTURE FOR SMALL FORM FACTORS

CROSS-REFERENCE TO RELATED APPLICATIONS

This application claims benefit of U.S. Provisional Patent Application No. 63/585,367, filed Sep. 26, 2023, the entire disclosures of which are incorporated herein by reference for all purposes.

FIELD OF THE DISCLOSURE

This relates generally to touch sensing architectures, and more particularly to a touch sensing architecture including a touch controller and a touch sensor panel operable within small form factor devices.

BACKGROUND OF THE DISCLOSURE

Many types of input devices are presently available for performing operations in a computing system, such as buttons or keys, mice, trackballs, joysticks, touch sensor panels, touch screens, styluses and the like. Touch sensor panels, in particular, are popular because of their ease and versatility of operation as well as their price. Capacitive touch sensor panels can be formed from a matrix of conductive plates (e.g., touch electrodes) made of materials such as copper, silver, conductive polymers, metal mesh, graphene, nanowires (e.g., silver nanowires) or nanotubes (e.g., carbon nanotubes). Touch sensor panels can allow a user to perform various functions by touching the touch sensor panel at one or more locations using a finger, stylus or other object. In general, touch sensor panels can recognize a touch and the position of the touch on the touch sensor panel, and the computing system can then interpret the touch in accordance with the position of the touch, and thereafter perform one or more actions based on the touch.

Small form factor devices can present touch sensing challenges. Their small size can present limitations on the size of touch sensor panels and the number of touch pixels in those touch sensor panels, and there may be insufficient space within the device to house the complex circuits (e.g., application-specific integrated circuits (ASICs)) and associated input/output (I/O) circuits (e.g., channels) and pins required to enable touch sensing functionality. In addition, handheld small form factor devices may necessitate multiple closely spaced touch inputs while a user is grasping the device (e.g., in a pen grip), which can lead to negative pixel effects and reduced touch sensor panel output signals, particularly when the user is poorly grounded.

Capacitive touch sensor panels can detect a touch, or a near-touch, of a proximate object by detecting the effect of capacitive coupling between the object and the touch electrodes. Capacitive touch sensor panels can utilize a self-capacitance touch sensing architecture or a mutual capacitance touch sensing architecture. Self-capacitance touch sensing is based on detecting a change in the self-capacitance between an electrode and ground. Mutual capacitance touch sensing is based on detecting a change in the mutual capacitance between a drive electrode and a sense electrode. In either architecture, integrating touch sensing into a small form factor device can be difficult due to the number of I/O channels needed to drive and sense the electrodes. For example, a pixelated self-capacitance architecture requires a relatively large number of I/O channels (e.g., one channel for each electrode), which may be difficult to provide when an associated touch controller chip is constrained in size and/or does not have enough I/O channels available to support the number of unique pixelated self-capacitance electrodes.

When a proximate object is well-grounded, charge can be coupled to ground through the object. In the case of mutual capacitance touch sensing, this coupling of charge to ground reduces the mutual capacitance between the drive electrode and the sense electrode of a touch pixel, and this reduction in mutual capacitance can be detected and recognized as a touch by sensing circuitry. However, when the object is poorly grounded or ungrounded, there can be less of a capacitive path to ground through the object. As a result, there is less shunting of charge to ground through the object, and a smaller reduction in mutual capacitance between the drive and sense electrode than with a well-grounded object. Because of the smaller reduction in mutual capacitance, the change in amplitude of sense signals as a result of the proximate object is reduced, and it can be more difficult to detect the presence of the object. In addition, when a poorly grounded or ungrounded object is located over multiple mutual capacitance touch pixels, such as when two or more fingers are touching the touch panel to perform an intended "multi-touch" user input, charge that would have been coupled to ground (in the case of a well-grounded object) can instead couple back onto a nearby sense electrode, creating a so-called "negative pixel" at that location due to the unexpected increase in charge at that nearby sense electrode. The decreased touch detection capability and the negative pixels that can result from a poorly grounded or ungrounded object can lead to touch detection errors.

BRIEF SUMMARY OF THE DISCLOSURE

This relates generally to touch sensing architectures, and more particularly to a touch sensing architecture including a touch controller and a touch sensor panel operable within small form factor devices. In some examples, the touch sensor panel is operable with a touch controller having a smaller footprint, fewer I/O channels and pins, and a smaller package size that can fit within the small form factor device. In some examples, the touch sensing architecture can be advantageously utilized with curved touch sensor panels and can effectively implement "multi-touch" capability (the ability to unambiguously detect two or more simultaneous touches on the touch sensor panel at least partially at the same time) while also minimizing the impact of so-called "negative pixels" and increasing the amplitude of sense signals even in the presence of poorly grounded or ungrounded touches on the touch surface. The touch sensing architecture can provide the same resolution as a pixelated self-capacitance touch sensor panel, but with a large reduction in I/O channels and pins. In some examples, this reduction in the number of I/O channels and pins needed for touch sensing can free up those channels and pins for use with other circuits and functions.

In some examples, the touch sensor panel can utilize a plurality of discrete column electrodes arranged in a plurality of columns, and a plurality of continuous row electrodes arranged in a plurality of rows. In some examples, the discrete column electrodes and the continuous row electrodes can be formed in the same layer. The electrodes in the rows and columns can functionally "intersect" in the x and y directions (without being directly electrically connected together), with each discrete column electrode that is situated within a particular row being surrounded by a portion of the continuous row electrode in that row. A touch pixel can be defined at the location of one discrete column electrode and the portion of the continuous row electrode that surrounds that discrete column electrode. Each continuous row electrode within a particular row surrounds the discrete column electrodes situated in that row. Each column can be divided into a plurality of regions, with each region being formed from a plurality of electrically connected discrete column electrodes within that column.

In some examples, a scan plan can be implemented by the touch controller and the touch sensor panel that includes a series of mutual capacitance scans and a series of projection self-capacitance scans that can be performed in any order. When performing mutual capacitance scans, the plurality of discrete column electrodes can be configured as drive electrodes, and the plurality of continuous row electrodes can be configured as sense electrodes. The plurality of electrically connected drive electrodes within each region can be driven with a transmit signal (a.k.a., a drive or stimulation signal) generated by a driver located in a separate touch controller circuit. In some examples, while a plurality of electrically connected drive electrodes within one region of one column are being driven with a transmit signal, the drive electrodes in one or more other regions of that column, and/or the drive electrodes in one or more regions of one or more other columns, can be held at a fixed potential such as ground to reduce the negative pixel effect. Each region within the plurality of columns can be sequentially driven with the transmit signal from a different driver in a sequence of steps. While the electrically connected drive electrodes in a particular region are being stimulated with a transmit signal, the voltage on the plurality of continuous sense electrodes located in those rows in which the stimulated drive electrodes are situated can be measured and monitored by a distinct sense circuit to detect voltage changes (e.g., changes in the amplitude of the AC stimulation signals that have coupled onto the continuous sense electrodes) indicative of an object (e.g., a finger) touching or in proximity to the touch pixel(s) located at or near the intersection of the stimulated discrete column electrodes and the monitored continuous sense electrodes. In some examples, the unmonitored continuous sense electrodes can also be held at a fixed potential such as ground to reduce the negative pixel effect.

When performing projection self-capacitance scans, the plurality of discrete column electrodes and the plurality of continuous row electrodes can be configured as self-capacitance electrodes. The projection self-capacitance scans include two phases that can be performed in either order. In one phase of the projection self-capacitance scans, in a first step, each of one or more of the plurality of continuous self-capacitance row electrodes can be driven with a stimulation signal and measured and monitored by a distinct channel to detect voltage changes that may be indicative of an object (e.g., a finger) touching or in proximity to the continuous self-capacitance row electrodes. In some examples, one or more additional steps may be performed to drive the remaining continuous self-capacitance row electrodes with a stimulation signal and measure and monitor voltage changes on those row electrodes using distinct channels to detect voltage changes that may be indicative of an object (e.g., a finger) touching or in proximity to the continuous self-capacitance row electrodes. In another phase of the projection self-capacitance scans, in a first step, each of the plurality of discrete self-capacitance column electrodes in one or more of the columns can be driven with a stimulation signal and measured and monitored by a distinct channel to detect voltage changes that may be indicative of an object (e.g., a finger) touching or in proximity to the discrete self-capacitance column electrodes. In some examples, one or more additional steps may be performed to drive the remaining discrete self-capacitance column electrodes in one or more additional columns with a stimulation signal and measure and monitor voltage changes on those discrete self-capacitance column electrodes using distinct channels to detect voltage changes that may be indicative of an object (e.g., a finger) touching or in proximity to the discrete self-capacitance column electrodes.

Although examples of the disclosure may be described herein in the context of a touch sensing architecture operable with small form factor devices and smaller touch controllers, and capable of implementing "multi-touch" while minimizing the impact of negative pixels and reduced signal levels due to poorly grounded objects, the scope of this disclosure is not so limited, and does not require that any of these advantages be present.

BRIEF DESCRIPTION OF THE DRAWINGS

FIGS. 1A-1J illustrate example devices that can include a touch sensing architecture according to examples of the disclosure.

FIG. 3A-2 illustrates an example row drive/sense circuit configured for a mutual capacitance measurement of a continuous row electrode according to examples of the disclosure.

FIG. 3B-1 illustrates an example column drive/sense circuit configured for a self-capacitance measurement of a discrete column electrode according to examples of the disclosure.

FIG. 3B-2 illustrates an example column driver configured for enabling a mutual capacitance measurement to be made at a continuous row electrode according to examples of the disclosure.

FIGS. 5A-5D illustrate a touch sensor panel and a series of mutual capacitance touch sensor panel scans according to examples of the disclosure.

FIGS. 5B-5D illustrate discrete column electrodes (without showing the continuous row electrodes) of a touch sensor panel configured for receiving mutual capacitance stimulation signals by being coupled to separate column drivers according to examples of the disclosure.

FIGS. 7-1 to 7-28 symbolically illustrate the scan plan described and shown in FIGS. 5A-5D and 6A-6G according to examples of the disclosure.

FIG. 8 illustrates a touch sensor panel during one mutual capacitance touch sensor panel scan with unstimulated discrete column electrodes and unmeasured continuous row electrodes optionally held at a fixed potential such as ground according to examples of the disclosure.

FIG. 9 illustrates a flowchart of the scan plan of FIGS. 7-1 to 7-28 according to examples of the disclosure.

DETAILED DESCRIPTION OF THE DISCLOSURE

Figure 2:
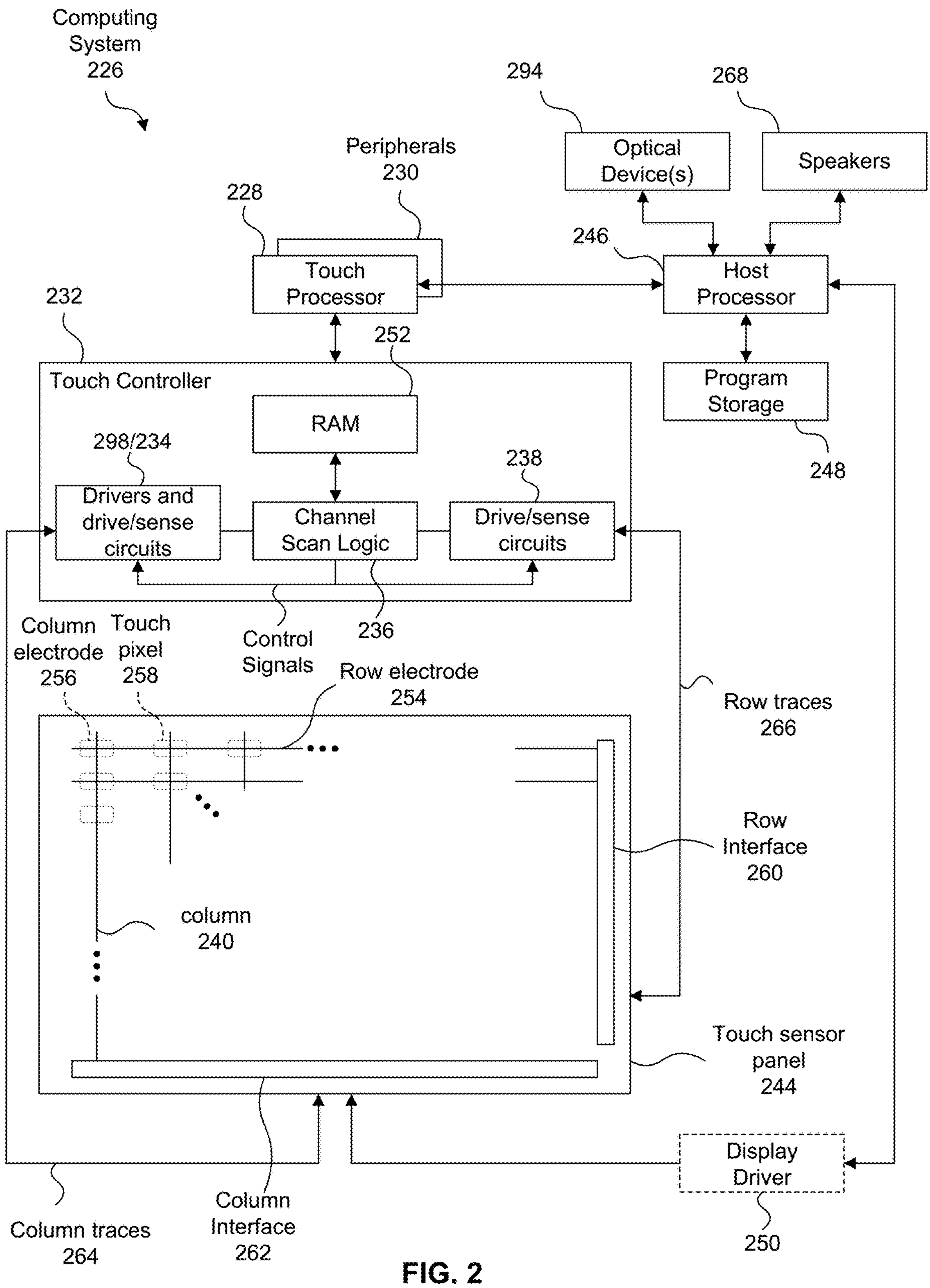
FIG. 2 illustrates an example computing system including a touch sensing architecture or system having a touch controller and a touch sensor panel operable within small form factor devices according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to touch sensing architectures, and more particularly to a touch sensing architecture including a touch controller and a touch sensor panel operable within small form factor devices. In some examples, the touch sensor panel is operable with a touch controller having a smaller footprint, fewer I/O channels and pins, and a smaller package size that can fit within the small form factor device. In some examples, the touch sensing architecture can be advantageously utilized with curved touch sensor panels and can effectively implement "multi-touch" capability (the ability to unambiguously detect two or more simultaneous touches on the touch sensor panel) while also minimizing the impact of so-called "negative pixels" and increasing the amplitude of sense signals even in the presence of poorly grounded or ungrounded touches on the touch surface. The touch sensing architecture can provide the same resolution as a pixelated self-capacitance touch sensor panel, but with a large reduction in I/O channels and pins. In some examples, this reduction in the number of I/O channels and pins needed for touch sensing can free up those channels and pins for use with other circuits and functions.

In some examples, the touch sensor panel can utilize a plurality of discrete column electrodes arranged in a plurality of columns, and a plurality of continuous row electrodes arranged in a plurality of rows. In some examples, the discrete column electrodes and the continuous row electrodes can be formed in the same layer. The electrodes in the rows and columns can functionally "intersect" in the x and y directions (without being directly electrically connected together), with each discrete column electrode that is situated within a particular row being surrounded by a portion of the continuous row electrode in that row. A touch pixel can be defined at the location of one discrete column electrode and the portion of the continuous row electrode that surrounds that discrete column electrode. Each continuous row electrode within a particular row surrounds the discrete column electrodes situated in that row. Each column can be divided into a plurality of regions, with each region being formed from a plurality of electrically connected discrete column electrodes within that column.

In some examples, a scan plan can be implemented by the touch controller and the touch sensor panel that includes a series of mutual capacitance scans and a series of projection self-capacitance scans that can be performed in any order. When performing mutual capacitance scans, the plurality of discrete column electrodes can be configured as drive electrodes, and the plurality of continuous row electrodes can be configured as sense electrodes. The plurality of electrically connected drive electrodes within each region can be driven with a transmit signal (a.k.a., a drive or stimulation signal) generated by a driver located in a separate touch controller circuit. In some examples, while a plurality of electrically connected drive electrodes within one region of one column are being driven with a transmit signal, the drive electrodes in one or more other regions of that column, and/or the drive electrodes in one or more regions of one or more other columns, can be held at a fixed potential such as ground to reduce the negative pixel effect. Each region within the plurality of columns can be sequentially driven with the transmit signal from a different driver in a sequence of steps. While the electrically connected drive electrodes in a particular region are being stimulated with a transmit signal, the voltage on the plurality of continuous sense electrodes located in those rows in which the stimulated drive electrodes are situated can be measured and monitored by a distinct sense circuit to detect voltage changes (e.g., changes in the amplitude of the AC stimulation signals that have coupled onto the continuous sense electrodes) indicative of an object (e.g., a finger) touching or in proximity to the touch pixel(s) located at or near the intersection of the stimulated discrete column electrodes and the monitored continuous sense electrodes. In some examples, the unmonitored continuous sense electrodes can also be held at a fixed potential such as ground to reduce the negative pixel effect.

When performing projection self-capacitance scans, the plurality of discrete column electrodes and the plurality of continuous row electrodes can be configured as self-capacitance electrodes. The projection self-capacitance scans include two phases that can be performed in either order. In one phase of the projection self-capacitance scans, in a first step, each of one or more of the plurality of continuous self-capacitance row electrodes can be driven with a stimulation signal and measured and monitored by a distinct channel to detect voltage changes that may be indicative of an object (e.g., a finger) touching or in proximity to the continuous self-capacitance row electrodes. In some examples, one or more additional steps may be performed to drive the remaining continuous self-capacitance row electrodes with a stimulation signal and measure and monitor voltage changes on those row electrodes using distinct channels to detect voltage changes that may be indicative of an object (e.g., a finger) touching or in proximity to the continuous self-capacitance row electrodes. In another phase of the projection self-capacitance scans, in a first step, each of the plurality of discrete self-capacitance column electrodes in one or more of the columns can be driven with a stimulation signal and measured and monitored by a distinct channel to detect voltage changes that may be indicative of an object (e.g., a finger) touching or in proximity to the discrete self-capacitance column electrodes. In some examples, one or more additional steps may be performed to drive the remaining discrete self-capacitance column electrodes in one or more additional columns with a stimulation signal and measure and monitor voltage changes on those discrete self-capacitance column electrodes using distinct channels to detect voltage changes that may be indicative of an object (e.g., a finger) touching or in proximity to the discrete self-capacitance column electrodes.

Although examples of the disclosure may be described herein in the context of a touch sensing architecture operable with small form factor devices and smaller touch controllers, and capable of implementing "multi-touch" while minimizing the impact of negative pixels and reduced signal levels due to poorly grounded objects, the scope of this disclosure is not so limited, and does not require that any of these advantages be present.

FIGS. 1A-1J illustrate example devices that can include a touch sensing architecture according to examples of the disclosure. FIG. 1A illustrates example mobile telephone

100 that includes touch screen 102 and a touch sensing architecture according to examples of the disclosure. FIG. 1B illustrates example digital media player 104 that includes touch screen 102 and a touch sensing architecture according to examples of the disclosure. FIG. 1C illustrates example personal computer 106 that includes touch screen 102 and trackpad 108 and a touch sensing architecture according to examples of the disclosure. FIG. 1D illustrates example tablet computing device 110 that includes touch screen 102 and a touch sensing architecture according to examples of the disclosure. FIG. 1E illustrates example wearable device 112 that includes touch screen 102 and a touch sensing architecture according to examples of the disclosure. FIG. 1F illustrates example smart speaker 114 that includes touch surface 122 and a touch sensing architecture according to examples of the disclosure. FIG. 1G illustrates example mouse 116 that includes touch surface 122 and a touch sensing architecture according to examples of the disclosure. FIG. 1H illustrates example stylus 124 that includes touch surface 122 and a touch sensing architecture according to examples of the disclosure. FIG. 1I illustrates example remote/gaming control 118 that includes touch surface 122 and a touch sensing architecture according to examples of the disclosure. FIG. 1J illustrates example headphones 120 that includes touch surface 122 and a touch sensing architecture according to examples of the disclosure. It is understood that the touch sensing architecture according to examples of the disclosure can be implemented in other devices as well.

In some examples, touch screen 102, touch surface 122, and trackpad 108 can be based on self-capacitance. A self-capacitance-based touch system can include a matrix of small, individual plates of conductive material or groups of individual plates of conductive material forming larger conductive regions that can be referred to as self-capacitance electrodes. For example, a touch sensor panel can include a plurality of individual self-capacitance electrodes, each self-capacitance electrode identifying or representing a unique location on the touch sensor panel at which touch or proximity is to be sensed, and each self-capacitance electrode being electrically isolated from the other self-capacitance electrodes in the touch sensor panel. Such a touch sensor panel can be referred to as a pixelated self-capacitance touch sensor panel, though it is understood that in some examples, the electrodes on the touch sensor panel can be used to perform scans other than self-capacitance scans of the touch sensor panel (e.g., mutual capacitance scans). During operation, a self-capacitance electrode can be stimulated with an alternating current (AC) waveform, and the self-capacitance to ground of the self-capacitance electrode can be measured. As an object approaches the self-capacitance electrode, the self-capacitance to ground of the self-capacitance electrode can change (e.g., increase). This change in the self-capacitance of the self-capacitance electrode can be detected and measured by the touch sensing system to determine the positions of multiple objects when they touch, or come in proximity to, the touch sensor panel. In some examples, the self-capacitance electrodes of a self-capacitance-based touch system can be formed from rows and columns of conductive material, and changes in the self-capacitance to ground of the rows and columns can be detected, similar to above. In some examples, a touch sensor panel can be multi-touch, single touch, projection scan, full-imaging multi-touch, capacitive touch, etc.

In some examples, touch screen 102, touch surface 122, and trackpad 108 can be based on mutual capacitance. A mutual capacitance-based touch system can include electrodes arranged as drive and sense electrodes that may cross over each other on different layers (in a double-sided configuration), or may be adjacent to each other on the same layer. The crossing or adjacent locations can form a matrix of mutual capacitance touch pixels. During operation, the drive electrode can be stimulated with an AC waveform and the mutual capacitance of the sense electrode can be measured. As an object approaches the touch pixel, the mutual capacitance of the touch pixel can change (e.g., decrease). This change in the mutual capacitance of the touch pixel can be detected and measured by the touch sensing system to determine the positions of multiple objects when they touch, or come in proximity to, the touch screen.

In some examples, touch screen 102, touch surface 122, and trackpad 108 can be configurable to perform mutual capacitance or self-capacitance touch sensing. The electrodes can be arranged as a matrix of small, individual plates of conductive material or as drive and sense electrodes, or in another pattern. The electrodes can be configurable for mutual capacitance or self-capacitance sensing or a combination of mutual and self-capacitance sensing. For example, in one mode of operation, electrodes can be configured to sense mutual capacitance between electrodes, and in a different mode of operation the electrodes can be configured to sense self-capacitance of electrodes. In some examples, some of the electrodes can be configured to sense mutual capacitance therebetween and some of the electrodes can be configured to sense self-capacitance thereof.

FIG. 2 illustrates example computing system 226 including a touch sensing architecture or system having a touch controller and a touch sensor panel operable within small form factor devices according to examples of the disclosure. Computing system 226 can be included in, for example, a mobile phone, portable media player, portable or desktop computer, tablet, watch, wearable device, smart speaker, mouse, stylus, remote control, headphones, earbuds, or any mobile or non-mobile computing device that includes a touch screen or touch sensor panel. Computing system 226 can include a touch sensing system including one or more touch processors 228, peripherals 230, touch controller 232, and touch sensing circuitry (described in more detail below). Peripherals 230 can include, but are not limited to, random access memory (RAM) or other types of memory or storage, watchdog timers and the like. Touch controller 232 can include, but is not limited to, column drivers 298 and column drive/sense circuits 234, channel scan logic 236, RAM 252, and row drive/sense circuits 238. Channel scan logic 236 can access RAM 252, autonomously read data from column drive/sense circuits 234 and row drive/sense circuits 238 (e.g., the channels) and provide control for the channels. In addition, channel scan logic 236 can control column drivers 298, column drive/sense circuits 234 and row drive/sense circuits 238 to generate stimulation signals 242 at various frequencies and/or phases that can be selectively applied to the electrodes of touch sensor panel 244, as described in more detail below. In some examples, touch controller 232, touch processor 228 and peripherals 230 can be integrated into a single application specific integrated circuit (ASIC), and in some examples can be integrated with touch sensor panel 244 itself.

It should be apparent that the architecture or system shown in FIG. 2 is only one example architecture of computing system 226, and that the system could have more or fewer components than shown, or a different configuration of components. In some examples, computing system 226 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware, or any combination thereof, including one or more signal processing and/or application specific integrated circuits.

Computing system 226 can include a host processor 246 for receiving outputs from touch processor 228 and performing actions based on the outputs. For example, host processor 246 can be connected to program storage 248 and optional display controller/driver 250 (e.g., a liquid-crystal display (LCD) driver) when touch sensor panel 244 is combined with a display to form a touch screen. It is understood that although some examples of the disclosure that utilize displays may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Optional display controller/driver 250 can provide voltages on select (e.g., gate) lines to each pixel transistor and can provide data signals along data lines to these same transistors to control the pixel display image.

Host processor 246 can use optional display controller/driver 250 to generate a display image on an optional display combined with touch sensor panel 244 to form a touch screen, such as a display image of a user interface (UI), and can use touch processor 228 and touch controller 232 to detect a touch on or near touch sensor panel 244, such as a touch input to the displayed UI. The touch input can be used by computer programs stored in program storage 248 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 246 can also perform additional functions that may not be related to touch processing.

Note that one or more of the functions described herein can be performed by firmware stored in memory (e.g., one of the peripherals 230 in FIG. 2) and executed by touch processor 228, or stored in program storage 248 and executed by host processor 246. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 252 or program storage 248 (or both) can be a non-transitory computer readable storage medium. One or both of RAM 252 and program storage 248 can have stored therein instructions, which when executed by touch processor 228 or host processor 246 or both, can cause the device including computing system 226 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a compact disc (CD), CD-R, CD-RW, digital video disc (DVD), DVD-R, or DVD-RW, or flash memory such as compact flash cards, secured digital cards, universal serial bus (USB) memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

Touch sensor panel 244, which can include a touch sensing architecture for small form factor devices and curved touch sensor panels operable with a reduced number of I/O lines that minimizes the effects of negative pixels and reduced sense signal levels, can be used to derive touch information at multiple discrete locations on the touch panel, referred to herein as touch nodes or pixels. Touch sensor panel 244 can include touch sensing circuitry that can include a capacitive sensing medium having a plurality of continuous row electrodes 254 (illustrated symbolically in FIG. 2 as lines) and a plurality of discrete column electrodes 256 (illustrated symbolically in FIG. 2 as rectangles) arranged in a plurality of columns 240. Touch pixels 258 can be defined at the location of one discrete column electrode 256 and the portion of the continuous row electrode 254 that surrounds that discrete column electrode. When configured for mutual capacitance sensing, column drivers 298 can transmit stimulation (drive) signals to one or more discrete column electrodes 256 in one or more columns 240 through column traces 264, and row drive/sense circuits 238 can sense voltages on one more continuous row electrodes 254 through row traces 266, as will be explained in greater detail below. When configured for self-capacitance sensing, row drive/sense circuits 238 can transmit self-capacitance stimulation signals onto continuous row electrodes 254 through row traces 266 and measure the voltage at the row electrodes using the same row drive/sense circuits through those same row lines, and column drive/sense circuits 234 can transmit self-capacitance stimulation signals onto discrete column electrodes 256 through column traces 264 and measure the voltage at the column electrodes using the same drive/sense circuits through those same column lines, as will be explained in greater detail below.

Through both mutual capacitance touch sensing and self-capacitance touch sensing, an indication of an amount of touch can be determined at each touch pixel 258, which can be thought of as touch picture elements (hence the term touch pixels). This way of understanding can be particularly useful when touch sensor panel 244 is part of a touch screen, and is viewed as capturing an "image" of touch ("touch image"). In other words, after touch controller 232 has determined whether a touch has been detected at each touch pixel 258, the pattern of touch pixels at which a touch occurred can be thought of as an "image" of touch (e.g., a pattern of fingers contacting or in proximity to touch sensor panel 244). As used herein, an electrical component "coupled to" or "connected to" another electrical component encompasses a direct or indirect connection providing electrical path for communication or operation between the coupled components. Thus, for example, continuous row electrodes 254 may be directly connected to row drive/sense circuits 238 or indirectly connected to the row drive/sense circuits via row interface 260, and discrete column electrodes 256 may be directly connected to column drive/sense circuits 234 or indirectly connected to the column drive/sense circuits via column interface 262. In either case an electrical path for driving and/or sensing the electrodes can be provided.

In some examples, computing system 226 can also include one or more optical devices 294, which may also be referred to herein as optical components. In some examples, the one or more optical devices 294 can include components for light emitting and/or light sensing. In some examples, the one or more optical devices 294 can include light-emitting diodes (e.g., LEDs, OLEDs, etc.), cameras, lasers (e.g., vertical-cavity surface-emitting lasers, etc.), light detectors, photodiodes, and the like. In some examples, the operation of the optical devices can be controlled by host processor 246 or an optical controller (not shown) to perform functionality using the optical devices. The functionality can include, without limitation, projecting light, imaging, proximity sensing and ranging, ambient light sensing, photography, etc., among other possibilities. In some examples, the one or more optical devices 294 can be implemented in proximity to touch sensor panel 244 (e.g., on a periphery of or in a notch region along a perimeter of the touch panel). As described in more detail herein, in some examples, the one or more optical devices 294 can be integrated with touch sensor panel 244 such that light passes through one or more layers of the touch panel.

In some examples, computing system 226 can also include one or more input and/or output devices, such as speaker 268. It is understood that speaker 268 is an example input and/or output device, but other input and/or output devices are possible. In some examples, the operation of the input and/or output devices, including speaker 268, can be controlled by host processor 246 or an input/output controller (not shown) to perform functionality using the input and/or output devices. The functionality can include audio functionality for speaker 268. In some examples, the one or more input and/or output devices can be implemented in proximity to touch sensor panel 244 (e.g., on a periphery of or in a notch region along a perimeter of the touch panel). As described in more detail herein, in some examples, the one or more input and/or output devices can be integrated with touch sensor panel 244. For example, integrated speaker 268 with touch sensor panel 244 and a touch screen can include an opening or one or more hole(s), can enable audio to pass through the touch screen. In some such examples, the opening(s) in the touch screen results in one or more touch electrode-free regions.

Figures 1, 3A:
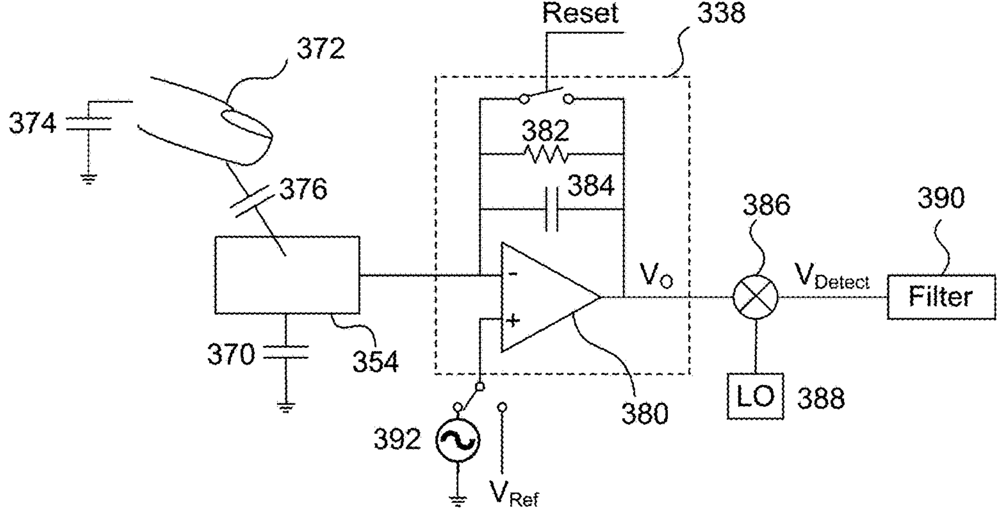
FIG. 3A-1 illustrates an example row drive/sense circuit configured for a self-capacitance measurement of a continuous row electrode according to examples of the disclosure.
Figures 2, 3A:
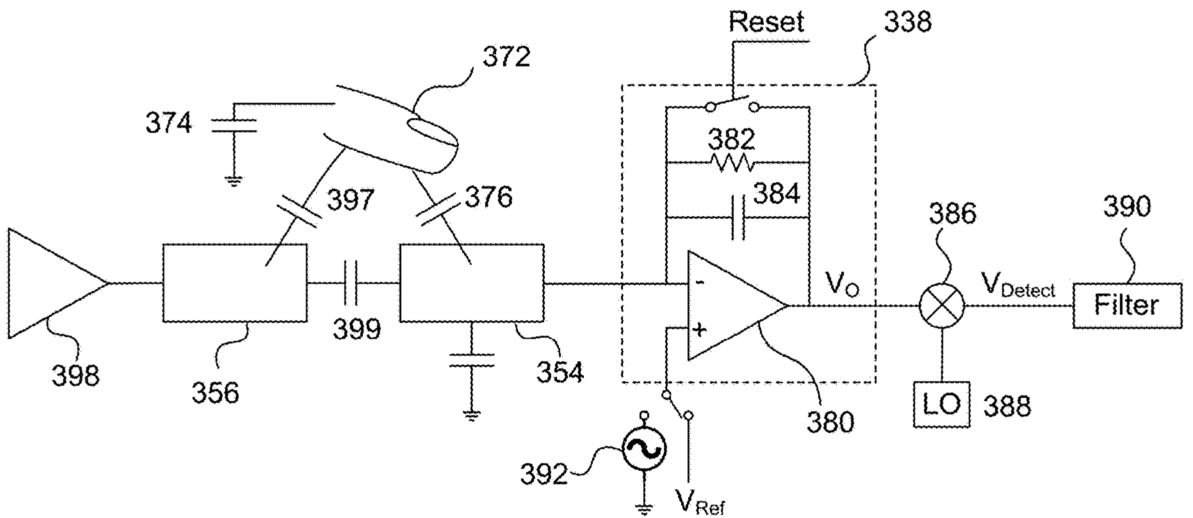

FIG. 3A-1 illustrates an example row drive/sense circuit 338 configured for a self-capacitance measurement of continuous row electrode 354 according to examples of the disclosure. When configured for self-capacitance sensing, continuous row electrode 354 can have an inherent self-capacitance 370 to ground associated with it, and also an additional self-capacitance to ground that is formed when an object, such as finger 372, is in proximity to or touching the electrode, and is itself capacitively coupled to ground via capacitance 374. As FIG. 3A-1 illustrates, the presence of finger 372 creates an additional capacitive path to ground (through capacitances 376 and 374) in parallel with the inherent self-capacitance 370 to ground, resulting in an increase in self-capacitance seen at continuous row electrode 354. Continuous row electrode 354 can be coupled to row drive/sense circuit 338. Row drive/sense circuit 338 can be configured to sense changes (e.g., increases) in the total self-capacitance of continuous row electrode 354 induced by a finger or object either touching or in proximity to the touch sensor panel. These changes in self-capacitance can be interpreted as an indication of touch.

Row drive/sense circuit 338 can include an operational amplifier 380, feedback resistor 382 and feedback capacitor 384, although other configurations can be employed. For example, feedback resistor 382 can be replaced by a switched capacitor resistor in order to minimize a parasitic capacitance effect that can be caused by a variable feedback resistor. FIG. 3A-1 illustrates a general case in which both resistive and capacitive feedback elements are utilized. The sense signal (referred to as Vin) from continuous row electrode 354 can be inputted into the inverting input of operational amplifier 380, and the non-inverting input of the operational amplifier can be coupled to AC voltage source 392 ($V_{ac}$). Operational amplifier 380 can drive its output to voltage $V_O$ to keep $V_{in}$ substantially equal to $V_{ac}$. A person of skill in the art would understand that in this context, equal can include deviations of up to 15%. The output (Vo) of row drive/sense circuit 338 can be filtered and heterodyned or homodyned by being fed into multiplier 386, where Vo can be multiplied with local oscillator 388 to produce $V_{detect}$. $V_{detect}$ can be inputted into filter 390. The output of filter 390 can be used by a processor or discrete logic network to determine the presence of a proximity or touch event. One skilled in the art will recognize that the placement of filter 390 can be varied; thus, the filter can be placed after multiplier 386, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIG. 3A-1 indicates that the demodulation at multiplier 386 occurs in the analog domain, output Vo may be digitized by an analog-to-digital converter (ADC), and multiplier 386, filter 390 and oscillator 388 may be implemented in a digital fashion (e.g., multiplier 386 can be a digital demodulator, filter 390 can be a digital filter, and oscillator 388 can be a digital NCO (Numerical Controlled Oscillator)).

FIG. 3A-2 illustrates an example row drive/sense circuit 338 configured for a mutual capacitance measurement of continuous row electrode 354 according to examples of the disclosure. Discrete column electrode 356 can be stimulated by a stimulation signal (e.g., an AC voltage signal) output from column driver 398 through column traces (e.g., column traces 264 of FIG. 2). The stimulation signal can be capacitively coupled from discrete column electrode 356 onto continuous row electrode 354 through mutual capacitance $C_{sig}$ 399 formed between the discrete column electrode and the continuous row electrode. When an object, such as finger 372, approaches the touch pixel created by the intersection of discrete column electrode 356 and continuous row electrode 354, a finger-to-drive line capacitance $C_{FD}$ 397, a finger-to-ground capacitance 374, and a finger-to-sense line capacitance $C_{FS}$ 376 is formed. As a result, charge is coupled to ground through finger 372 rather than onto continuous row electrode 354 through CES 376, and mutual capacitance $C_{sig}$ 399 can change (e.g., decrease). The row drive/sense circuit 338 of FIG. 3A-2 is similar to that of FIG. 3A-1, except that when configured for mutual capacitance sensing, a reference voltage $V_{Ref}$ can be switchably coupled to the non-inverting input (+) of operational amplifier 380. In some examples, different feedback resistances and/or capacitances may also need to be switchably inserted into the amplifier circuit for mutual capacitance sensing. Row drive/sense circuit 338 can be configured to sense changes (e.g., decreases) in the mutual capacitance seen by continuous row electrode 354 due to a finger or object either touching or in proximity to the touch sensor panel. These changes in mutual capacitance can be interpreted as an indication of touch.

Figures 1, 3B:
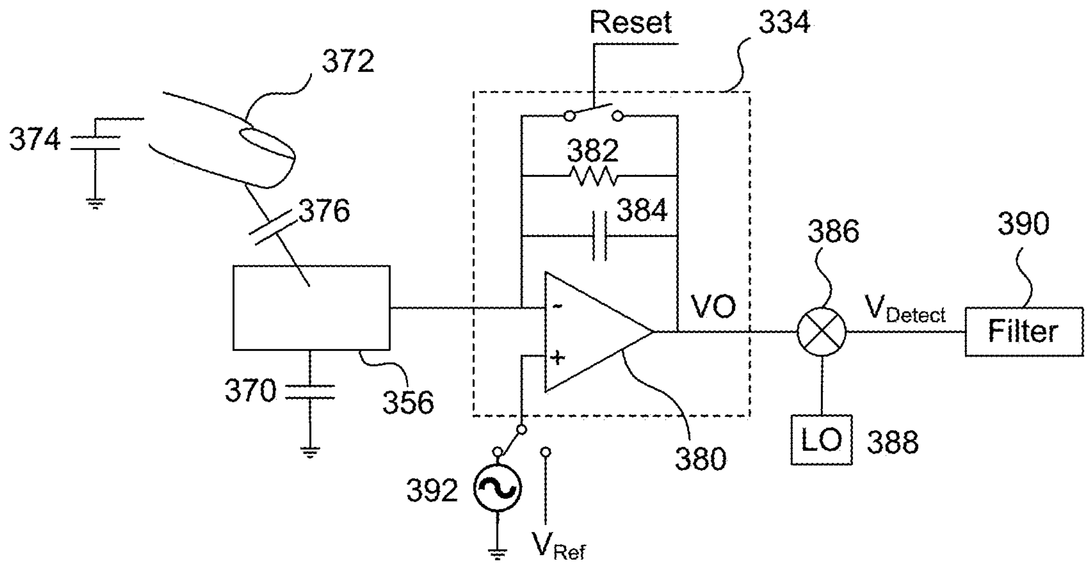
Figures 2, 3B:
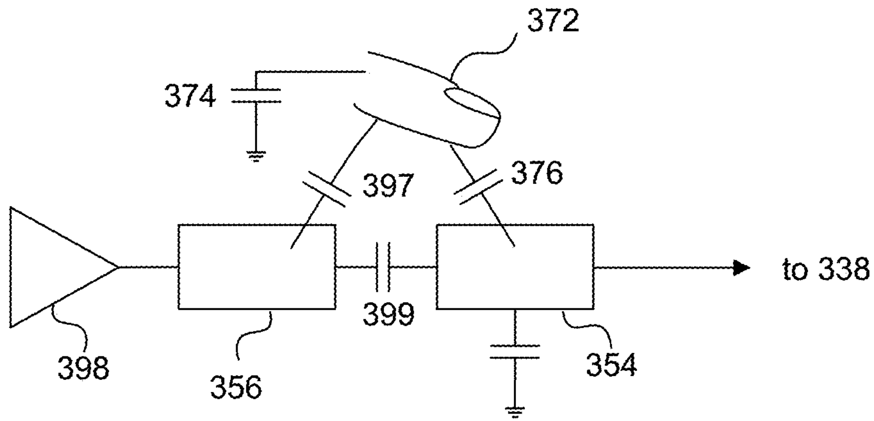

FIG. 3B-1 illustrates an example column drive/sense circuit 334 configured for a self-capacitance measurement of discrete column electrode 356 according to examples of the disclosure. When configured for self-capacitance sensing, discrete column electrode 356 can have an inherent self-capacitance 370 to ground associated with it, and also an additional self-capacitance to ground that is formed when an object, such as finger 372, is in proximity to or touching the electrode, and is itself capacitively coupled to ground via capacitance 374. As FIG. 3B-1 illustrates, the presence of finger 372 creates an additional capacitive path to ground (through capacitances 376 and 374) in parallel with the inherent self-capacitance 370 to ground, resulting in an increase in self-capacitance seen at discrete column electrode 356. Discrete column electrode 356 can be coupled to column drive/sense circuit 334. Column drive/sense circuit 334 can be configured to sense changes (e.g., increases) in the total self-capacitance of discrete column electrode 356 induced by a finger or object either touching or in proximity to the touch sensor panel. These changes in self-capacitance can be interpreted as an indication of touch. Column drive/sense circuit 334 in FIG. 3B-1 is similar to that shown in FIG. 3A-1, and thus its description will be omitted here for brevity.

FIG. 3B-2 illustrates an example column driver 398 configured for enabling a mutual capacitance measurement to be made at continuous row electrode 354 according to examples of the disclosure. Column driver 398 is shown in FIG. 3A-2 and previously discussed, and thus its description will be omitted here for brevity.

Figure 4A:
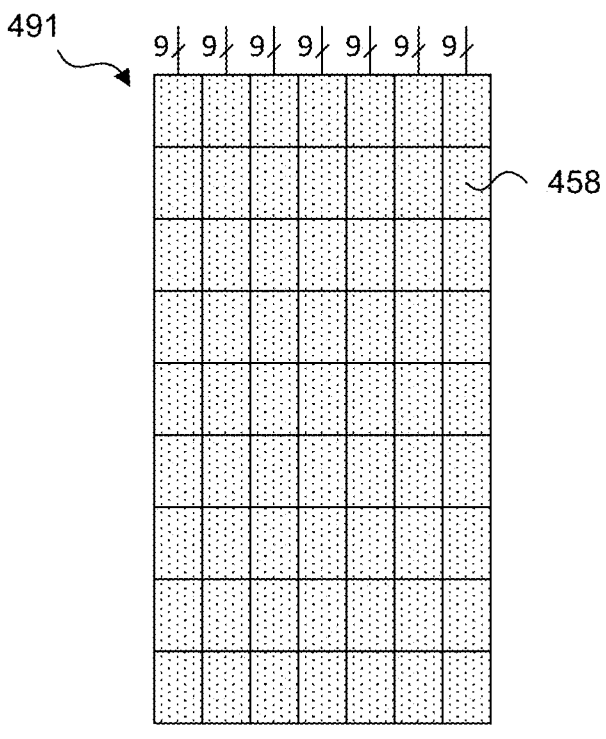
FIG. 4A illustrates a touch sensor panel with touch pixels symbolically represented as squares and arranged in a self-capacitance sensor panel configuration according to examples of the disclosure.

FIG. 4A illustrates touch sensor panel 491 with touch pixels 458 symbolically represented as rectangles and arranged in a pixelated self-capacitance sensor panel configuration according to examples of the disclosure. Specifically, touch sensor panel 491 can include a plurality of individual touch pixels 458, each touch pixel identifying or representing a unique location on the touch sensor panel at which touch or proximity (i.e., a touch or proximity event) is to be sensed, and each touch pixel being electrically isolated from the other touch pixels in the touch sensor panel, as previously described. Touch pixels 458 can be on the same or different material layers on touch sensor panel 491. Touch sensor panel 491 can sense the self-capacitance of touch pixels 458 to detect touch and/or proximity activity on the touch sensor panel. Because each touch pixel 458 is separately driven and sensed, the example 7×9 array of touch pixels in FIG. 4A requires 63 separate I/O channels (assuming no multiplexing of I/O channels), as symbolically illustrated by the nine lines at the top of each of the seven columns of nine touch pixels each. However, a small form factor device may not have the volume to house one or more circuits (e.g., one or more application-specific integrated circuits (ASICs)) with 63 separate I/O channels. Even if the one or more ASICs had sufficient I/O, it may be desirable to utilize some of those I/O for other device functions. It is also possible that the small form factor device may utilize a current ASIC design with limited I/O and/or no multi-touch capability that is impractical or impossible to upgrade or otherwise replace. For any or all of these reasons, a full pixelated self-capacitance touch sensor panel may be impractical in a small form factor device.

Figure 4B:
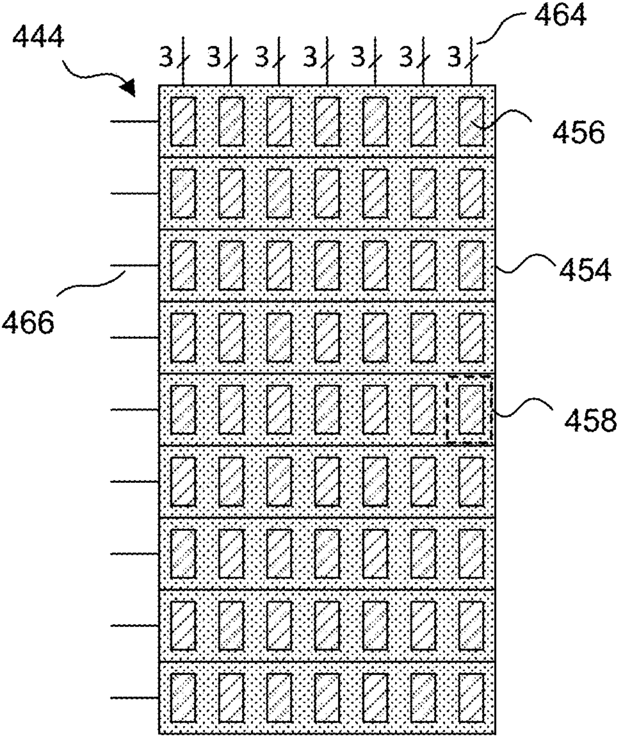
FIG. 4B illustrates a touch sensor panel with discrete column electrodes and continuous row electrodes according to examples of the disclosure.

FIG. 4B illustrates touch sensor panel 444 with discrete column electrodes 456 and continuous row electrodes 454 (referred to as continuous because they extend across the horizontal width of the touch sensor panel) according to examples of the disclosure. In some examples, discrete column electrodes 456 and continuous row electrodes 454 can be formed in the same layer. In other examples, discrete column electrodes 456 and continuous row electrodes 454 can be formed in a different layer, such as on opposite sides of the same substrate, or on different substrates. In a functional sense, the electrodes in the rows and columns can "intersect" in the x and y directions (without being directly electrically shorted together), with each discrete column electrode 456 that is situated within a particular row being surrounded by a portion of the continuous row electrode 454 in that row. Touch pixel 458 can be defined at the location of one discrete column electrode 456 and the portion of continuous row electrode 454 that surrounds that discrete column electrode, as shown in FIG. 4B. In examples where discrete column electrodes 456 and continuous row electrodes 454 are formed in the same layer, portions of the continuous row electrode surround a discrete column electrode in the same layer. In examples where discrete column electrodes 456 and continuous row electrodes 454 are formed in different layers, portions of the continuous row electrode still "surround" a discrete column electrode, as that term is used herein, albeit when viewed from a z-direction or plan view perspective, such as shown in FIG. 4B. Each continuous row electrode 454 within a particular row surrounds the discrete column electrodes 456 situated in that row. The example of FIG. 4B illustrates seven continuous row electrodes 454, each row electrode electrically connected to a touch controller via row traces 466. Although not evident in FIG. 4B, each column can be divided into a plurality of regions, with each region being formed from a plurality of electrically connected discrete column electrodes 456 within that column. In the example of FIG. 4B, each column includes nine discrete column electrodes 456, and although not shown in FIG. 4B, each column includes three regions, with each region including three discrete column electrodes that are electrically connected together. The electrical connections from a touch controller to the three regions are symbolically illustrated by the three column traces 464 shown at the top of each column.

It should be understood that the 7×9 touch sensor panel 444 in FIG. 4B is merely exemplary, and that the number of rows, the number of columns, the number of regions in each column, and the number of discrete column electrodes 456 in each region can vary according to various examples of the disclosure. For example, curved cylindrical touch surfaces such as those found on a stylus are likely to have longer columns oriented parallel to the axis of the stylus, and shorter rows oriented circumferentially around the stylus and perpendicular to the axis of the stylus. Accordingly, the number of rows (e.g., 9) may exceed the number of columns (e.g., 7) in a stylus-shaped device.

As noted above, in some examples of the disclosure, a scan plan can be implemented by the touch controller upon the touch sensor panel that includes a series of mutual capacitance scans and a series of projection self-capacitance scans that can be performed in either order.

FIGS. 5A-5D illustrate touch sensor panel 544 and a series of mutual capacitance touch sensor panel scans according to examples of the disclosure. FIG. 5A illustrates continuous row electrodes 554 (without showing the discrete column electrodes) of touch sensor panel 544 configured for mutual capacitance sensing by being coupled to row drive/sense circuits 538 (e.g., row drive/sense circuits 338 in FIG. 3A-2) via row traces 566. The voltages (e.g., the amplitude of an AC signal) induced on some or all of continuous row electrodes 554 due to mutual capacitance coupling can be measured during each of the mutual capacitance scans, as will be explained in greater detail below.

FIGS. 5B-5D illustrate discrete column electrodes 556 (without showing the continuous row electrodes) of touch sensor panel 544 configured for receiving mutual capacitance stimulation signals by being coupled to separate column drivers 598 (e.g., column drivers 398 in FIG. 3B-2) according to examples of the disclosure. It should be understood that any one of FIGS. 5B-5D can be superimposed over FIG. 5A to obtain a more complete picture of touch sensor panel 544. In the example of FIGS. 5B-5D, each column includes three regions, with each region consisting of three discrete column electrodes 556 (labeled with the same numbers in FIGS. 5B-5D) that are electrically connected together and to a separate column driver 598 via column traces 564. In some examples, column traces 564 can be formed on a different layer from discrete column electrodes 556. The mutual capacitance at each touch pixel in can be measured by first stimulating the plurality of discrete column electrodes 556 in each region with transmit or drive signals generated by column drivers 598 in a series of steps, while measuring the voltage at some or all of continuous row electrodes 554 at row drive/sense circuits 538 as shown in FIG. 5A.

Mutual capacitance sensing steps 1-7 are shown in FIG. 5B. In step 1, a first region in column C1 that is formed from a plurality of directly electrically connected discrete column electrodes (e.g., discrete column electrodes 556 labeled with the number 1 in FIG. 5B) is stimulated with a transmit or drive signal generated by column driver 598. In some examples, while the first region in C1 is being stimulated, some or all of the other regions in C1 may be held at a fixed potential (e.g., ground), and in other examples, some or all of the other regions in columns C2-C7 can also be held at the fixed potential. While the first region in C1 is being stimulated, at least continuous row electrodes 554 in rows R1, R4 and R7 of FIG. 5A (e.g., those rows that correspond to discrete column electrodes 556 labeled with the number 1 in FIG. 5B) can be measured, although in other embodiments some or all of the other continuous row electrodes can also be measured (though little to no change in the sensed signal may be present on those row electrodes). In some examples, while continuous row electrodes 554 in R1, R4 and R7 are being measured, some or all of the continuous row electrodes in other rows (e.g., R2, R3, R5, R6, R8 and R9) can be held at the fixed potential.

After the measurement of continuous row electrodes 554 in R1, R4 and R7 is complete, step 2 can begin. In step 2, a first region in C2 that is formed from a plurality of directly electrically connected discrete column electrodes (e.g., discrete column electrodes 556 labeled with the number 2 in FIG. 5B) is stimulated with a transmit or drive signal generated by column driver 598. In some examples, while the first region in C2 is being stimulated, some or all of the other regions in C2 may be held at a fixed potential (e.g., ground), and in other examples, some or all of the other regions in C1 and C3-C7 can also be held at the fixed potential. While the first region in C2 is being stimulated, at least continuous row electrodes 554 in R1, R4 and R7 of FIG. 5A (e.g., those rows that correspond to discrete column electrodes 556 labeled with the number 2 in FIG. 5B) can be measured, although in other embodiments some or all of the other continuous row electrodes can also be measured (though little to no change in the sensed signal may be present on those row electrodes). In some examples, while continuous row electrodes 554 in R1, R4 and R7 are being measured, some or all of the other rows (e.g., R2, R3, R5, R6, R8 and R9) can be held at the fixed potential. This process can be repeated for each first region in C3-C7 in mutual capacitance sensing steps 3-7.

Mutual capacitance sensing steps 8-14 are shown in FIG. 5C. In step 8, a second region in C1 that is formed from a plurality of directly electrically connected discrete column electrodes (e.g., discrete column electrodes 556 labeled with the number 8 in FIG. 5C) is stimulated with a transmit or drive signal generated by column driver 598. In some examples, while the second region in C1 is being stimulated, some or all of the other regions in C1 may be held at a fixed potential (e.g., ground), and in other examples, some or all of the other regions in C2-C7 can also be held at the fixed potential. While the second region in C1 is being stimulated, at least continuous row electrodes 554 in R2, R5 and R8 of FIG. 5A (e.g., those rows that correspond to discrete column electrodes 556 labeled with the number 8 in FIG. 5C) can be measured, although in other embodiments some or all of the other continuous row electrodes can also be measured (though little to no change in the sensed signal may be present on those row electrodes). In some examples, while continuous row electrodes 554 in R2, R5 and R8 are being measured, some or all of the continuous row electrodes in other rows (e.g., R1, R3, R4, R6, R7 and R9) can be held at the fixed potential.

After the measurement of continuous row electrodes 554 in R2, R5 and R8 is complete, step 9 can begin. In step 9, a second region in C2 that is formed from a plurality of directly electrically connected discrete column electrodes (e.g., discrete column electrodes 556 labeled with the number 9 in FIG. 5C) is stimulated with a transmit or drive signal generated by column driver 598. In some examples, while the second region in C2 is being stimulated, some or all of the other regions in C2 may be held at a fixed potential (e.g., ground), and in other examples, some or all of the other regions in C1 and C3-C7 can also be held at the fixed potential. While the second region in C2 is being stimulated, at least continuous row electrodes 554 in rows R2, R5 and R8 of FIG. 5A (e.g., those rows that correspond to discrete column electrodes 556 labeled with the number 9 in FIG. 5C) can be measured, although in other embodiments some or all of the other continuous row electrodes can also be measured (though little to no change in the sensed signal may be present on those row electrodes). In some examples, while continuous row electrodes 554 in R2, R5 and R8 are being measured, some or all of the other rows (e.g., R1, R3, R4, R6, R7 and R9) can be held at the fixed potential. This process can be repeated for each second region in C3-C7 in mutual capacitance sensing steps 10-14.

Mutual capacitance sensing steps 15-21 are shown in FIG. 5D. In step 15, a third region in C1 that is formed from a plurality of directly electrically connected discrete column electrodes (e.g., discrete column electrodes 556 labeled with the number 15 in FIG. 5D) is stimulated with a transmit or drive signal generated by column driver 598. In some examples, while the third region in C1 is being stimulated, some or all of the other regions in C1 may be held at a fixed potential (e.g., ground), and in other examples, some or all of the other regions in C2-C7 can also be held at the fixed potential. While the third region in C1 is being stimulated, at least continuous row electrodes 554 in rows R3, R6 and R9 of FIG. 5A (e.g., those rows that correspond to discrete column electrodes 556 labeled with the number 15 in FIG. 5D) can be measured, although in other embodiments some or all of the other continuous row electrodes can also be measured (though little to no change in the sensed signal may be present on those row electrodes). In some examples, while continuous row electrodes 554 in R3, R6 and R9 are being measured, some or all of the continuous row electrodes in other rows (e.g., R1, R2, R4, R5, R7 and R8) can be held at the fixed potential.

After the measurement of continuous row electrodes 554 in R3, R6 and R9 is complete, step 16 can begin. In step 16, a third region in C2 that is formed from a plurality of directly electrically connected discrete column electrodes (e.g., discrete column electrodes 556 labeled with the number 16 in FIG. 5D) is stimulated with a transmit or drive signal generated by column driver 598. In some examples, while the third region in C2 is being stimulated, some or all of the other regions in C2 may be held at a fixed potential (e.g., ground), and in other examples, some or all of the other regions in C1 and C3-C7 can also be held at the fixed potential. While the third region in C2 is being stimulated, at least continuous row electrodes 554 in rows R3, R6 and R9 of FIG. 5A (e.g., those rows that correspond to discrete column electrodes 556 labeled with the number 16 in FIG. 5D) can be measured, although in other embodiments some or all of the other continuous row electrodes can also be measured (though little to no change in the sensed signal may be present on those row electrodes). In some examples, while continuous row electrodes 554 in R3, R6 and R9 are being measured, some or all of the other rows (e.g., R1, R2, R4, R5, R7 and R9) can be held at the fixed potential. This process can be repeated for each third region in C3-C7 in mutual capacitance sensing steps 17-21.

At the conclusion of the series of mutual capacitance touch sensor panel scans illustrated in FIGS. 5A-D, an image of touch can be captured from the mutual capacitance touch measurements at each of the touch pixels in touch sensor panel 544, including disambiguated multiple touches occurring at about the same time (e.g., multi-touch), if any. It should be understood that the 7×9 touch sensor panel 544 in FIGS. 5A-5D is merely exemplary, and that the number of rows, the number of columns, the number of regions in each column, and the number of discrete column electrodes 556 in each region can vary according to various examples of the disclosure. In addition, the actual discrete column electrodes 556 in each region can be different from what is shown in FIGS. 5B-5D, and the order of the steps can be different from what is shown in FIGS. 5B-5D. For example, each of the multiple regions in columns C1-C7 can be stimulated in any order. Furthermore, the number of separate column drivers 598 and regions may be dictated by the number of I/O channels in an existing touch controller, and/or the availability (or lack thereof) of so-called "multi-stim" touch controller functionality (e.g., the stimulation of multiple drive regions at the same time), but in other examples any number of separate drivers may be employed.

Figures 6A, 6B, 6C:
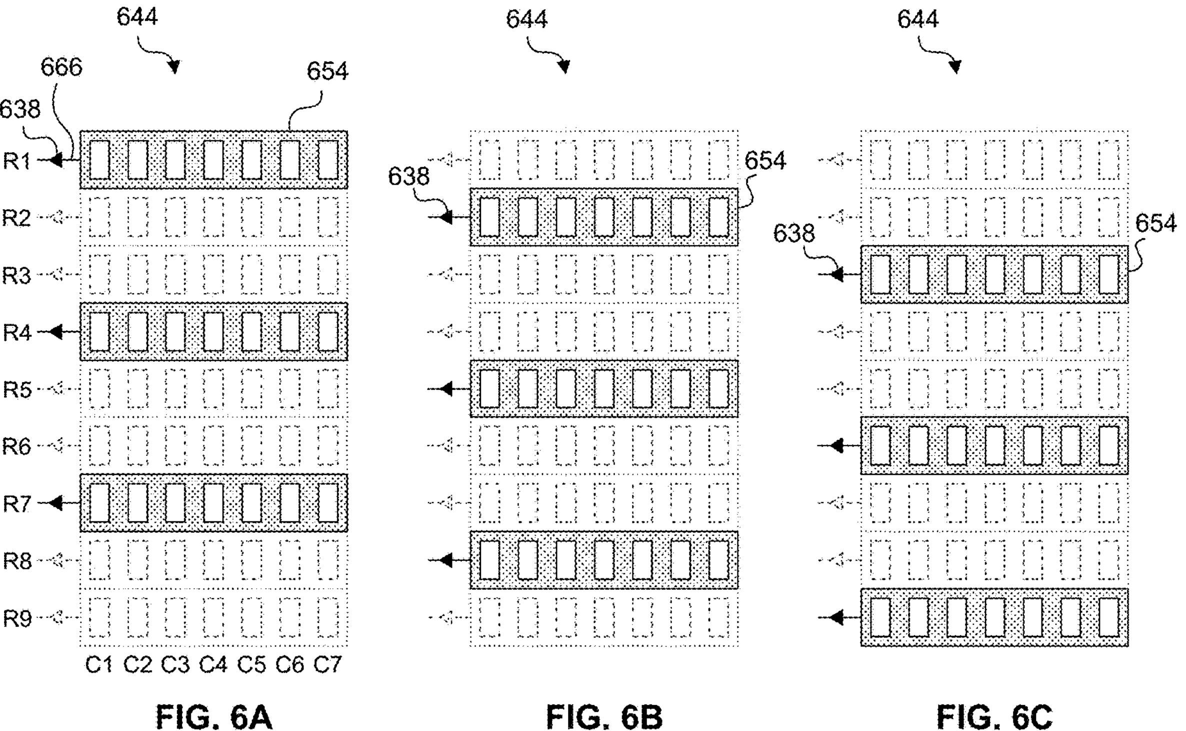
FIGS. 6A-6G illustrate a touch sensor panel and a series of projection self-capacitance touch sensor panel scans according to examples of the disclosure.

FIGS. 6A-6G illustrate touch sensor panel 644 and a series of projection self-capacitance touch sensor panel scans according to examples of the disclosure. FIGS. 6A-6C illustrate continuous row electrodes 654 (without showing the discrete column electrodes) on touch sensor panel 644 configured for projection self-capacitance sensing by being coupled to row drive/sense circuits 638 (e.g., row drive/sense circuits 338 in FIG. 3A-1) via row traces 666. The voltages (e.g., the amplitude of an AC signal) on some or all of continuous row electrodes 654 due to changes in self-capacitance can be measured during each of the projection self-capacitance scans, as will be explained in greater detail below.

Step 1 of the series of projection self-capacitance touch sensor panel scans is shown in FIG. 6A. In step 1, row drive/sense circuits 638 can apply a stimulation signal to continuous row electrodes 654 in rows R1, R4 and R7, and also measure the voltages (e.g., the amplitude of the stimulation signal) on those continuous row electrodes. Step 2 of the series of projection self-capacitance touch sensor panel scans is shown in FIG. 6B. In step 2, row drive/sense circuits 638 can apply a stimulation signal to continuous row electrodes 654 in rows R2, R5 and R8, and also measure the voltages (e.g., the amplitude of the stimulation signal) on those continuous row electrodes. Step 3 of the series of projection self-capacitance touch sensor panel scans is shown in FIG. 6C. In step 3, row drive/sense circuits 638 can apply a stimulation signal to continuous row electrodes 654 in rows R3, R6 and R9, and also measure the voltages (e.g., the amplitude of the stimulation signal) on those continuous row electrodes. At the conclusion of steps 1-3 of the projection self-capacitance touch sensor panel scan, the measured AC signals at each continuous row electrode 654 in R1-R9, and any changes in the amplitudes of those AC signals, can indicate an amount of touch detected at each row, but not necessarily the location of the touch along each row.

Figures 6D, 6E, 6F, 6G:
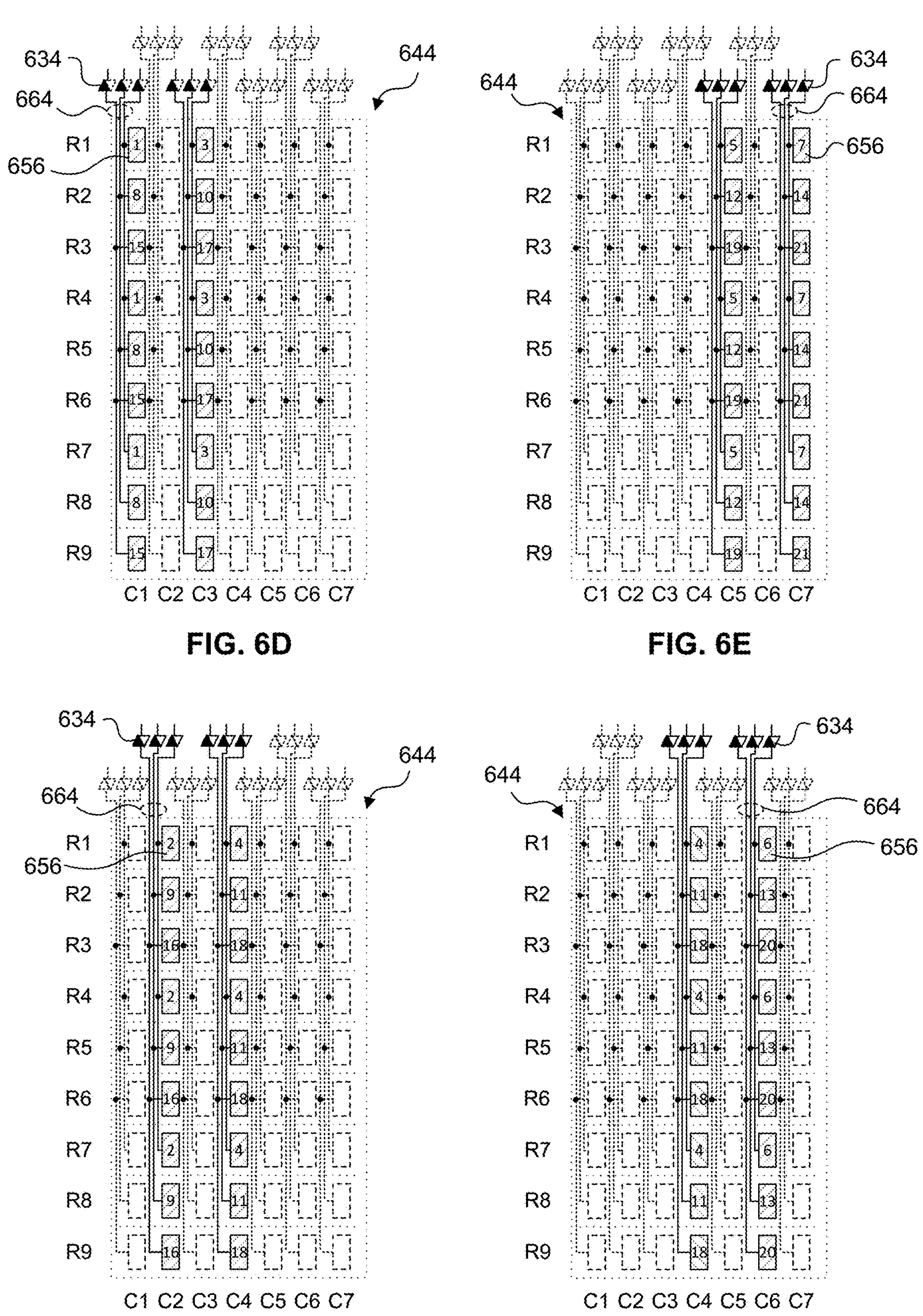

FIGS. 6D-6G illustrate discrete column electrodes 656 (without showing the continuous row electrodes) on touch sensor panel 644 configured for projection self-capacitance sensing by being coupled to column drive/sense circuits 634 (e.g., column drive/sense circuits 334 in FIG. 3B-1) via column traces 664. Step 4 of the series of projection self-capacitance touch sensor panel scans is shown in FIG. 6D. In step 4, a first column drive/sense circuit 634 can apply a stimulation signal to the directly electrically connected discrete column electrodes 656 in rows R1, R4 and R7 (labeled with the number 1) in a first region of column C1, and also measure the voltages (e.g., the amplitude of the stimulation signal) in the first region. A second column drive/sense circuit 634 can apply a stimulation signal to the directly electrically connected discrete column electrodes 656 in rows R2, R5 and R8 (labeled with the number 8) in a second region of column C1, and also measure the voltages (e.g., the amplitude of the stimulation signal) in the second region. A third column drive/sense circuit 634 can apply a stimulation signal to the directly electrically connected discrete column electrodes 656 in rows R3, R6 and R9 (labeled with the number 15) in a third region of column C1, and also measure the voltages (e.g., the amplitude of the stimulation signal) in the third region. A fourth column drive/sense circuit 634 can apply a stimulation signal to the directly electrically connected discrete column electrodes 656 in rows R1, R4 and R7 (labeled with the number 3) in a first region of column C3, and also measure the voltages (e.g., the amplitude of the stimulation signal) in the first region. A fifth column drive/sense circuit 634 can apply a stimulation signal to the directly electrically connected discrete column electrodes 656 in rows R2, R5 and R8 (labeled with the number 10) in a second region of column C3, and also measure the voltages (e.g., the amplitude of the stimulation signal) in the second region. A sixth column drive/sense circuit 634 can apply a stimulation signal to the directly electrically connected discrete column electrodes 656 in rows R3, R6 and R9 (labeled with the number 17) in a third region of column C3, and also measure the voltages (e.g., the amplitude of the stimulation signal) in the third region. In some examples, the stimulation and measurement of these six regions in step 4 can be performed concurrently, although it other examples some of the regions can be stimulated and measured concurrently, while other regions can be stimulated and measured sequentially. It should also be noted that the six concurrent self-capacitance measurements taken in step 4 is merely an example, and that in other examples the number of concurrent self-capacitance measurements may be different (larger or smaller) and may depend on the limitations of an existing touch controller chip design.

Step 5 of the series of projection self-capacitance touch sensor panel scans is shown in FIG. 6E. In step 5, a first column drive/sense circuit 634 can apply a stimulation signal to the directly electrically connected discrete column electrodes 656 in rows R1, R4 and R7 (labeled with the number 5) in a first region of column C5, and also measure the voltages (e.g., the amplitude of the stimulation signal) in the first region. A second column drive/sense circuit 634 can apply a stimulation signal to the directly electrically connected discrete column electrodes 656 in rows R2, R5 and R8 (labeled with the number 12) in a second region of column C5, and also measure the voltages (e.g., the amplitude of the stimulation signal) in the second region. A third column drive/sense circuit 634 can apply a stimulation signal to the directly electrically connected discrete column electrodes 656 in rows R3, R6 and R9 (labeled with the number 19) in a third region of column C5, and also measure the voltages (e.g., the amplitude of the stimulation signal) in the third region. A fourth column drive/sense circuit 634 can apply a stimulation signal to the directly electrically connected discrete column electrodes 656 in rows R1, R4 and R7 (labeled with the number 7) in a first region of column C7, and also measure the voltages (e.g., the amplitude of the stimulation signal) in the first region. A fifth column drive/sense circuit 634 can apply a stimulation signal to the directly electrically connected discrete column electrodes 656 in rows R2, R5 and R8 (labeled with the number 14) in a second region of column C7, and also measure the voltages (e.g., the amplitude of the stimulation signal) in the second region. A sixth column drive/sense circuit 634 can apply a stimulation signal to the directly electrically connected discrete column electrodes 656 in rows R3, R6 and R9 (labeled with the number 21) in a third region of column C7, and also measure the voltages (e.g., the amplitude of the stimulation signal) in the third region. In some examples, the stimulation and measurement of these six regions in step 5 can be performed concurrently, although it other examples some of the regions can be stimulated and measured concurrently, while other regions can be stimulated and measured sequentially.

Step 6 of the series of projection self-capacitance touch sensor panel scans is shown in FIG. 6F. In step 6, a first column drive/sense circuit 634 can apply a stimulation signal to the directly electrically connected discrete column electrodes 656 in rows R1, R4 and R7 (labeled with the number 2) in a first region of column C2, and also measure the voltages (e.g., the amplitude of the stimulation signal) in the first region. A second column drive/sense circuit 634 can apply a stimulation signal to the directly electrically connected discrete column electrodes 656 in rows R2, R5 and R8 (labeled with the number 9) in a second region of column C2, and also measure the voltages (e.g., the amplitude of the stimulation signal) in the second region. A third column drive/sense circuit 634 can apply a stimulation signal to the directly electrically connected discrete column electrodes 656 in rows R3, R6 and R9 (labeled with the number 16) in a third region of column C2, and also measure the voltages (e.g., the amplitude of the stimulation signal) in the third region. A fourth column drive/sense circuit 634 can apply a stimulation signal to the directly electrically connected discrete column electrodes 656 in rows R1, R4 and R7 (labeled with the number 4) in a first region of column C4, and also measure the voltages (e.g., the amplitude of the stimulation signal) in the first region. A fifth column drive/sense circuit 634 can apply a stimulation signal to the directly electrically connected discrete column electrodes 656 in rows R2, R5 and R8 (labeled with the number 11) in a second region of column C4, and also measure the voltages (e.g., the amplitude of the stimulation signal) in the second region. A sixth column drive/sense circuit 634 can apply a stimulation signal to the directly electrically connected discrete column electrodes 656 in rows R3, R6 and R9 (labeled with the number 18) in a third region of column C4, and also measure the voltages (e.g., the amplitude of the stimulation signal) in the third region. In some examples, the stimulation and measurement of these six regions in step 6 can be performed concurrently, although it other examples some of the regions can be stimulated and measured concurrently, while other regions can be stimulated and measured sequentially.

Step 7 of the series of projection self-capacitance touch sensor panel scans is shown in FIG. 6G. In step 7, a first column drive/sense circuit 634 can apply a stimulation signal to the directly electrically connected discrete column electrodes 656 in rows R1, R4 and R7 (labeled with the number 6) in a first region of column C6, and also measure the voltages (e.g., the amplitude of the stimulation signal) in the first region. A second column drive/sense circuit 634 can apply a stimulation signal to the directly electrically connected discrete column electrodes 656 in rows R2, R5 and R8 (labeled with the number 13) in a second region of column C6, and also measure the voltages (e.g., the amplitude of the stimulation signal) in the second region. A third column drive/sense circuit 634 can apply a stimulation signal to the directly electrically connected discrete column electrodes 656 in rows R3, R6 and R9 (labeled with the number 20) in a third region of column C6, and also measure the voltages (e.g., the amplitude of the stimulation signal) in the third region.

Steps 1-7 of the series of projection self-capacitance touch sensor panel scans, as described above, are sufficient to capture a self-capacitance measurement of all of the regions in columns C1-C7. Nevertheless, it can be advantageous to at least configure touch sensor panel 644 to measure the self-capacitance of the regions in a second column (e.g., column C4) in step 7 to provide measurement symmetry, even though those regions were previously measured in step 6 as shown in FIG. 6F. When the number of sensing channels changes from one step to another, the touch controller's sensitivity to noise aggressors can shift slightly, which can create measurement inaccuracies when the noise aggressors are at or near the operational frequency of the touch controller. Accordingly, in some examples of the disclosure, the number of regions being measured (and therefore the number of channels being utilized for measurement within the touch controller) are kept the same in all measurement steps.

Therefore, in an optional step 7 configuration, a fourth column drive/sense circuit 634 can apply a stimulation signal to the directly electrically connected discrete column electrodes 656 in rows R1, R4 and R7 (labeled with the number 4) in a first region of column C4, a fifth column drive/sense circuit 634 can apply a stimulation signal to the directly electrically connected discrete column electrodes 656 in rows R2, R5 and R8 (labeled with the number 11) in a second region of column C4, and a sixth column drive/sense circuit 634 can apply a stimulation signal to the directly electrically connected discrete column electrodes 656 in rows R3, R6 and R9 (labeled with the number 18) in a third region of column C4. As mentioned above, measurement of the regions in C4 represents only one example, and another column can be chosen in other examples. These optional additional projection self-capacitance measurement configurations ensure that step 7 contains six concurrent projection self-capacitance measurement configurations, just like in steps 1-6, and that there is no variation in sensing channels from step to step. In some examples, although touch sensor panel 644 may be configured to measure the changes in self-capacitance in the regions of column C4 in the optional configuration of step 7 as described above, no measurements are actually captured, saved or processed, and in other examples, the measurements may be captured but later discarded or ignored during subsequent data processing steps. In still other examples, the measurements may be utilized along with the previous measurements of the regions in column C4 (e.g., the self-capacitance measurements may be averaged, one may be discarded in favor of the other, etc.). Although the stimulation and measurement of the six regions in step 7 can be performed concurrently for measurement symmetry, in other examples some of the regions can be stimulated and measured concurrently, while other regions can be stimulated and measured sequentially.

At the conclusion of steps 4-7 of the projection self-capacitance touch sensor panel scan, the measured AC signals at each region in C1-C7, and any changes in the amplitudes of those AC signals, can indicate an amount of touch detected at each region of C1-C7, but not the specific location of the touch in each column, because each region in a column is formed from three discrete column electrodes 656 in the example of FIGS. 6D-6G. Nevertheless, the row touch information of steps 1-3 (indicating a touch at one or more rows) can be combined with the region touch information of steps 4-7 (indicating a touch at or more rows within one or more columns) to capture an image of touch at each of the touch pixels in touch sensor panel 544, including disambiguated multiple touches occurring at about the same time (e.g., multi-touch).

The series of projection self-capacitance touch sensor panel scans can complement the series of mutual capacitance touch sensor panel scans. In some examples, because mutual capacitance touch sensing can suffer from negative pixels and reduced signal amplitudes, the self-capacitance scan can be used to confirm or correct the image of touch captured by the mutual capacitance touch sensor panel scans.

FIGS. 7-1 to 7-28 symbolically illustrate the scan plan previously described and shown in FIGS. 5A-5D and 6A-6G according to examples of the disclosure. Each of FIGS. 7-1 to 7-28 illustrate touch sensor panel 744 including 9 rows (R1-R9) of continuous row electrodes 754 and 7 columns (C1-C7) of discrete column electrodes 756. FIGS. 7-1 to 7-21 illustrate the series of 21 mutual capacitance touch sensor panel scans corresponding to the touch sensor panel configurations of FIGS. 5A-5D, with darkened discrete column electrodes 756 representing driven mutual capacitance discrete column electrodes, and shaded continuous row electrodes 754 representing sensed mutual capacitance continuous row electrodes. FIGS. 7-22 to 7-28 illustrate the series of seven projection self-capacitance touch sensor panel scans corresponding to the touch sensor panel configurations of FIGS. 6A-6G, with the shaded continuous row electrodes 754 representing sensed projection self-capacitance continuous row electrodes, and the darkened discrete column electrodes 756 representing sensed projection self-capacitance discrete column electrodes.

Figures 1, 2, 3, 4, 5, 6, 7, 8, 9, 10, 11, 12, 13, 14, 15, 16, 17, 18, 19, 20, 21, 22, 23, 24, 25, 26, 27, 28:
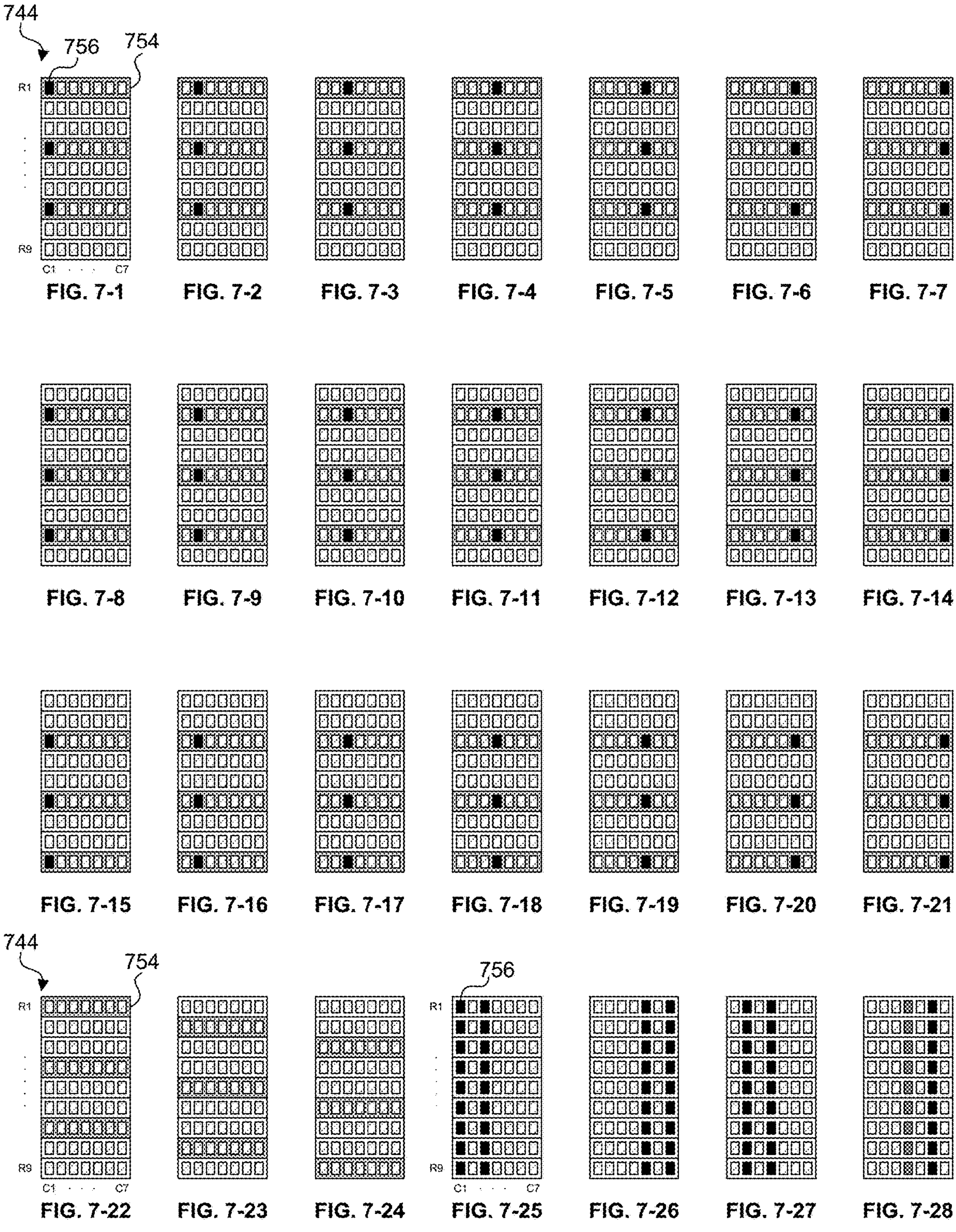
Figure 8:
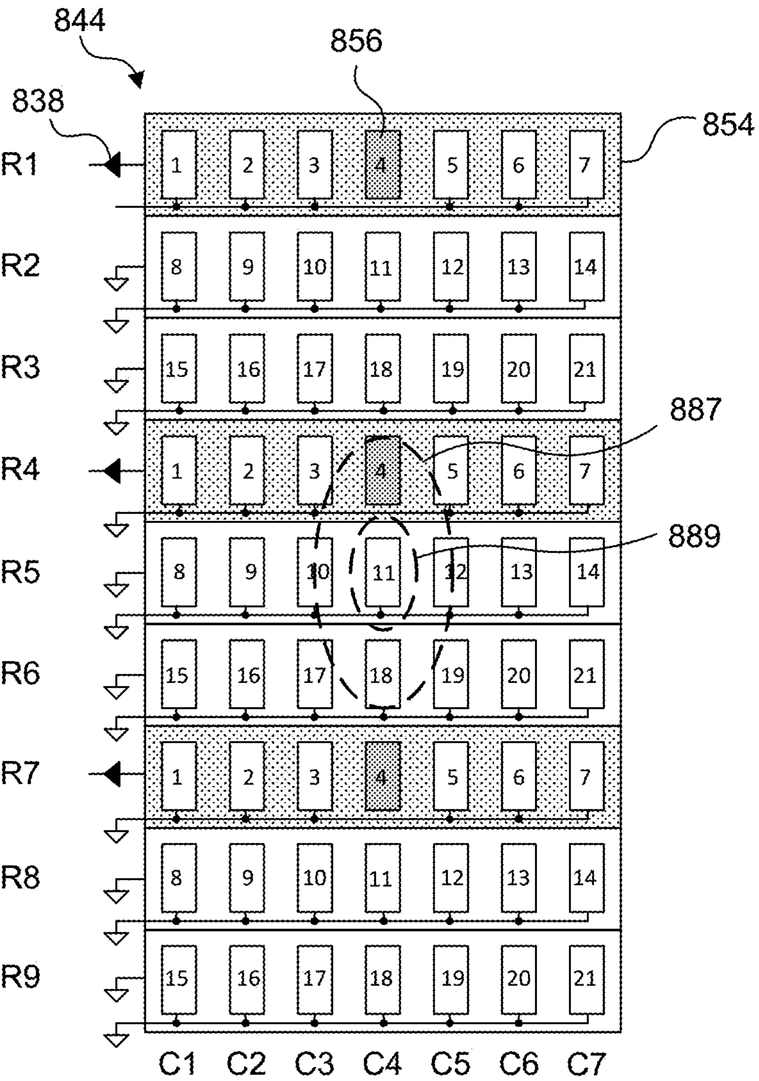
Figure 9:
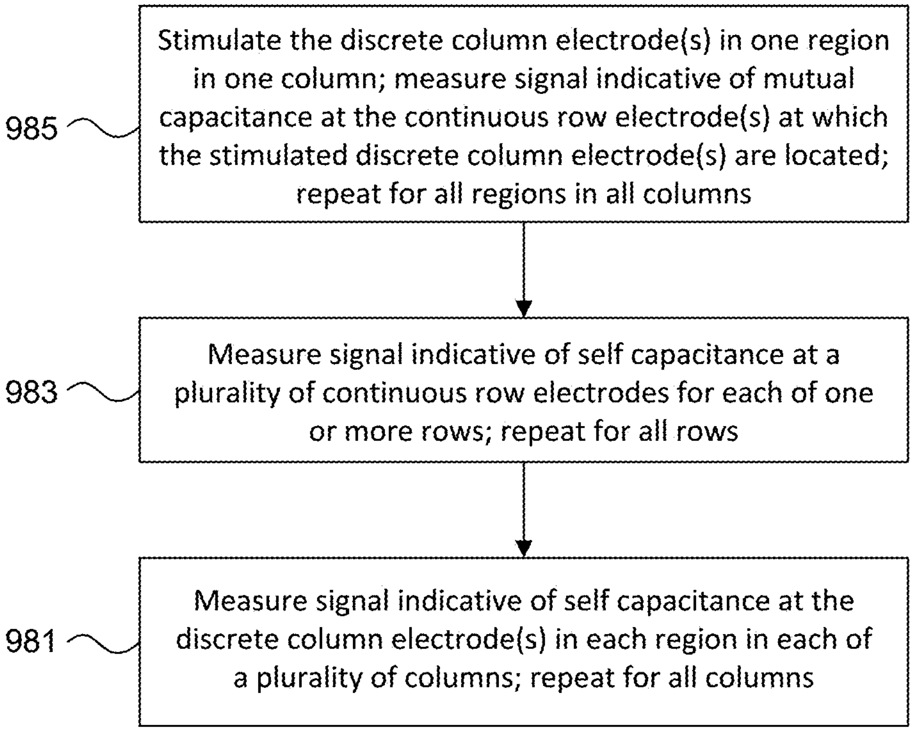

FIG. 8 illustrates touch sensor panel 844 during one mutual capacitance touch sensor panel scan with unstimulated discrete column electrodes 856 and unmeasured continuous row electrodes 854 optionally held at a fixed potential such as ground according to examples of the disclosure. The example of FIG. 8 illustrates the mutual capacitive drive configuration of step 4 of FIG. 5B superimposed over the mutual capacitance sense configuration of FIG. 5A, where a first region in column C4 (e.g., discrete column electrodes 556 labeled with the number 4) are stimulated with a transmit or drive signal generated by a driver (e.g., column driver 598 in FIG. 5B), and continuous row electrodes 854 in rows R1, R4 and R7 are measured using row drive/sense circuits 838. In the example of FIG. 8, discrete column electrodes 856 in all other unstimulated regions in column C4 and all of the other columns C1-C3 and C5-C7 are held at a fixed potential such as ground. Optionally, all continuous row electrodes 854 in all unmeasured rows (e.g., R2, R3, R5, R6, R8 and R9) can also be held at a fixed potential such as ground.

When an object is poorly grounded or ungrounded, there can be less of a capacitive path to ground through the object (e.g., a reduction in the finger-to-ground capacitance, or $C_{FG}$). As a result, there is less shunting of charge to ground through the object, and a smaller reduction in mutual capacitance ($\Delta C_{SIG}$) between the drive and sense electrode than with a well-grounded object. Because of this smaller reduction in mutual capacitance, it can be more difficult to detect the presence of the object. In addition, when a poorly grounded or ungrounded object is located over multiple mutual capacitance touch pixels, such as when two fingers are touching the touch panel, charge that would have been coupled to ground (in the case of a well-grounded object) can instead couple back onto a nearby sense electrode (e.g., through a finger-to-sense capacitance, or $C_{FS}$), creating a so-called "negative pixel" at that location due to the unexpected increase in charge at that nearby sense electrode. The decreased touch detection capability and the negative pixels that can result from a poorly grounded or ungrounded object can lead to touch detection errors. Grounding discrete column electrodes 856 in unstimulated regions in the columns, and optionally grounding unmeasured continuous row electrodes 854, can provide a capacitive path to ground for the touching object, whether the object is well-grounded or poorly grounded. Because of this capacitive path to ground, there is more shunting of charge to ground through the object, and an increased reduction in mutual capacitance between the drive and sense electrode than with a poorly-grounded object. Because of this larger reduction in mutual capacitance, it can be easier to detect the presence of the object. In addition, when an object is located over multiple mutual capacitance touch pixels, such as when two fingers are touching the touch panel, more charge is coupled to ground and less charge is coupled back onto nearby sense electrodes, reducing the "negative pixel" at that location. As a result, fewer touch detection errors may occur.

In the example of FIG. 8, the discrete column electrodes 856 (identified by the number 4) in the first region of column 4 (and moreover, the discrete column electrodes in all regions in all columns) are separated by two grounded discrete column electrodes. Although in other examples, the discrete column electrodes 856 in each region of a column can be separated by different numbers of grounded discrete column electrodes (e.g., one, three, four, etc.), it should be understood that in general, increased numbers of grounded discrete column electrodes can increase the shunting of charge to ground through the object, which can reduce the negative pixel effect and create a larger reduction in mutual capacitance, thereby improving object detection. In some examples, the number of grounded discrete column electrodes 856 between each driven discrete column electrode can be a function of the largest object (e.g., finger) size for which negative pixel and reduced signal amplitude is to be compensated for. The benefit of grounded discrete column electrodes 856 can be explained in the context of an example median size object contact area 889 and a large size contact area 887 as shown in FIG. 8, as discussed below.

As shown in the example of FIG. 8, median size object contact area 889 is located over the touch pixel at R5/C4, but is not located over the touch pixel at R4/C4. Thus, the fringing electric fields that form between discrete column electrode 856 at R4/C4 and continuous row electrode 854 in R4 when the discrete column electrodes labeled with the number 4 are stimulated are only minimally interrupted by the object at the object contact area, and thus there is only a minimal change in the mutual capacitance ($\Delta C_{SIG}$) at the touch pixel at R4/C4. However, median size object contact area 889 is directly over the touch pixel at R5/C4, which is grounded. Thus, any charge coupled onto the object from the stimulated discrete column electrode 856 located at R4/C4 is shunted to ground through the grounded touch pixel at R5/C4 (e.g., through $C_{FG}$), and negative pixel effects are minimized. In contrast, large size object contact area 887 is located over the touch pixel at R4/C4, and thus that object at that location will disrupt the electric fields at that touch pixel and cause a change in mutual capacitance. In addition, large size object contact area 887 is also located over the grounded touch pixels located at R5/C4 and R6/C4. Any charge coupled onto the object from the stimulated discrete column electrode 856 located at R4/C4 will be shunted to ground through both grounded touch pixels at R5/C4 and R6/C4. Thus, any charge coupled onto the object from the stimulated discrete column electrode 856 located at R4/C4 is shunted to ground through both the grounded touch pixel at R5/C4 and the grounded touch pixel at R6/C4, and negative pixel effects are minimized.

FIG. 9 illustrates a flowchart of the scan plan of FIGS. 7-1 to 7-28 according to examples of the disclosure. At block 985, the discrete column electrode(s) in one region in one column are stimulated, and the AC signals indicative of the mutual capacitance at the continuous row electrode(s) at which the stimulated discrete column electrode(s) are located is measured. The stimulation of discrete column electrodes in a region and the measurement of the corresponding continuous row electrodes is repeated for all regions in all columns. Block 985 corresponds to FIGS. 7-1 to 7-21. At block 983, the AC signals indicative of the self-capacitance at a plurality of continuous row electrodes is measured for each of one or more rows. The measurement of the AC signals at a plurality of continuous row electrodes at each of one or more rows is repeated for all rows. Block 983 corresponds to FIGS. 7-22 to 7-24. At block 981, the AC signals indicative of the self-capacitance at the discrete column electrodes in each region of a plurality of columns is measured. The measurement of the AC signals at the discrete column electrodes in each region of a plurality of columns is repeated for all columns. Block 981 corresponds to FIGS. 7-25 to 7-28.

Therefore, according to the above, some examples of the disclosure are directed to a touch sensing system for detecting one or more touches on a device surface occurring at least partially at the same time, comprising a touch sensor panel including a plurality of discrete column electrodes arranged in a plurality of columns, and a plurality of continuous row electrodes arranged in a plurality of rows, wherein a first continuous row electrode of the plurality of continuous row electrodes situated in a first row surrounds a first subset of the plurality of discrete column electrodes situated in the first row. Additionally or alternatively to one of more of the examples disclosed above, in some examples the touch sensing system further comprises one or more regions in each of the plurality of columns, each region in a particular column including one or more of the discrete column electrodes situated in that column, wherein all of the one or more discrete column electrodes in a particular region are electrically connected together. Additionally or alternatively to one of more of the examples disclosed above, in some examples the one or more discrete column electrodes in a particular region in a particular column are separated by at least one discrete column electrode associated with a different region. Additionally or alternatively to one of more of the examples disclosed above, in some examples the plurality of discrete column electrodes and the plurality of continuous row electrodes are formed on the same layer. Additionally or alternatively to one of more of the examples disclosed above, in some examples the touch sensing system further comprises a touch controller communicatively coupled with the touch sensor panel and configured to implement a scan plan including both mutual capacitance sensing and self-capacitance sensing utilizing the touch sensor panel. Additionally or alternatively to one of more of the examples disclosed above, in some examples the touch controller is further configured to perform the mutual capacitance sensing by sequentially driving the one or more discrete column electrodes in each of the one or more regions in each of the plurality of columns with a stimulation signal, and in accordance with driving the one or more discrete column electrodes in a particular region of a particular column with the stimulation signal, measuring an AC signal at each of the one or more continuous row electrodes at which the stimulated one or more discrete column electrodes of the particular region are situated, each measured AC signal indicative of a mutual capacitance at a touch pixel defined at an intersection of each of the measured continuous row electrodes and one of the stimulated discrete column electrodes. Additionally or alternatively to one of more of the examples disclosed above, in some examples the touch controller is further configured to, in accordance with driving the one or more discrete column electrodes in a particular region of a particular column with the stimulation signal, coupling one or more unstimulated discrete column electrodes to a reference voltage. Additionally or alternatively to one of more of the examples disclosed above, in some examples the touch controller is further configured to, in accordance with the measuring of the AC signal at each of the one or more continuous row electrodes at which the stimulated one or more discrete column electrodes of the particular region are situated, coupling one or more unmonitored continuous row electrodes to a reference voltage. Additionally or alternatively to one of more of the examples disclosed above, in some examples the touch controller is further configured to perform the self-capacitance sensing by driving one or more of the plurality of continuous row electrodes with a stimulation signal, and in accordance with driving each of the one or more continuous row electrodes with the stimulation signal, measuring an AC signal at each of the driven one or more continuous row electrodes, the measured AC signal at each driven continuous row electrode indicative of a self-capacitance at the driven continuous row electrode. Additionally or alternatively to one of more of the examples disclosed above, in some examples the touch controller is further configured to, in accordance with the measuring of the AC signal at each of the driven one or more continuous row electrodes, coupe one or more undriven continuous row electrodes to a reference voltage. Additionally or alternatively to one of more of the examples disclosed above, in some examples the touch controller is further configured to perform the self-capacitance sensing by driving the one or more discrete column electrodes in each region of one or more columns with a stimulation signal, and in accordance with driving the one or more discrete column electrodes in each region of the one or more columns with the stimulation signal, measuring an AC signal at the driven one or more discrete column electrodes in each region of the one or more columns, the measured AC signal indicative of the self-capacitance at that region. Additionally or alternatively to one of more of the examples disclosed above, in some examples the touch controller is further configured to, in accordance with the measuring of the AC signal at the driven one or more discrete column electrodes in each region of the one or more columns, coupling one or more undriven discrete column electrodes to a reference voltage.

Some examples of the disclosure are directed to a method for detecting one or more touches occurring at least partially at the same time on a touch sensor panel having a plurality of discrete column electrodes arranged in a plurality of columns and a plurality of continuous row electrodes arranged in a plurality of rows, the method comprising performing mutual capacitance touch sensing by sequentially driving one or more discrete column electrodes in each of one or more regions in each of the plurality of columns with a stimulation signal, and in accordance with driving the one or more discrete column electrodes in a particular region with the stimulation signal, measuring an AC signal at each of the one or more continuous row electrodes at which the stimulated one or more discrete column electrodes of the particular region are situated, each measured AC signal indicative of a mutual capacitance at a touch pixel defined at an intersection of each of the measured continuous row electrodes and one of the stimulated discrete column electrodes, and performing self-capacitance touch sensing by driving one or more of the plurality of continuous row electrodes with a stimulation signal, and in accordance with driving the one or more continuous row electrodes with the stimulation signal, measuring an AC signal at each of the driven one or more continuous row electrodes, the measured AC signal at each driven continuous row electrode indicative of a self-capacitance at the driven continuous row electrode. Additionally or alternatively to one of more of the examples disclosed above, in some examples the method further comprises performing the mutual capacitance sensing by, in accordance with driving the one or more discrete column electrodes in a particular region with the stimulation signal, coupling one or more unstimulated discrete column electrodes to a reference voltage. Additionally or alternatively to one of more of the examples disclosed above, in some examples the method further comprises performing the mutual capacitance sensing by, in accordance with the measuring of the AC signal at each of the one or more continuous row electrodes at which the stimulated one or more discrete column electrodes of the particular region are situated, coupling one or more unmeasured continuous row electrodes to a reference voltage. Additionally or alternatively to one of more of the examples disclosed above, in some examples the method further comprises performing the self-capacitance sensing by, in accordance with the measuring of the AC signal at each of the driven one or more continuous row electrodes, coupling one or more undriven continuous row electrodes to a reference voltage. Additionally or alternatively to one of more of the examples disclosed above, in some examples the method further comprises performing the self-capacitance sensing by driving the one or more discrete column electrodes in each region of one or more columns with a stimulation signal, and in accordance with driving the one or more discrete column electrodes in each region of the one or more columns with the stimulation signal, measuring an AC signal at the driven one or more discrete column electrodes in each region of the one or more columns, the measured AC signal indicative of the self-capacitance at that region. Additionally or alternatively to one of more of the examples disclosed above, in some examples the method further comprises, in accordance with the measuring of the AC signal at the driven one or more discrete column electrodes in each region of the one or more columns, coupling one or more undriven discrete column electrodes to a reference voltage. Additionally or alternatively to one of more of the examples disclosed above, in some examples the method further comprises, in accordance with the measuring of the AC signal at the driven one or more discrete column electrodes in each region of the one or more columns, coupling one or more undriven discrete column electrodes to a reference voltage. Additionally or alternatively to one of more of the examples disclosed above, in some examples the method further comprises a computing device configured to perform one or more of the methods disclosed above. Additionally or alternatively to one of more of the examples disclosed above, in some examples a non-transitory computer-readable storage medium stores instructions that, when executed by the one or more processors at the touch sensing device, causes the one or more processors to perform one or more of the examples disclosed above.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensing system for detecting one or more touches on a device surface occurring at least partially at a same time, comprising:

a touch sensor panel including:

a plurality of discrete column electrodes arranged in a plurality of columns; and one or more regions in each of the plurality of columns, each region in a particular column including one or more of the discrete column electrodes situated in that column, wherein:

all of the one or more discrete column electrodes in a particular region are electrically connected together, and the one or more discrete column electrodes in the particular region in the particular column are separated by at least one discrete column electrode associated with a different region;

a plurality of continuous row electrodes arranged in a plurality of rows;

wherein a first continuous row electrode of the plurality of continuous row electrodes situated in a first row surrounds a first subset of the plurality of discrete column electrodes situated in the first row; and a touch controller communicatively coupled with the touch sensor panel and configured to perform touch sensing by driving the one or more discrete column electrodes in the particular region in the particular column with a stimulation signal.

2. The touch sensing system of claim 1, wherein the plurality of discrete column electrodes and the plurality of continuous row electrodes are formed on a same layer.

3. The touch sensing system of claim 1, wherein the one or more discrete column electrodes in the particular region in the particular column that are electrically connected together are driven with the stimulation signal from a particular driving circuit.

4. The touch sensing system of claim 1, the touch controller further configured to implement a scan plan including both mutual capacitance sensing and self-capacitance sensing utilizing the touch sensor panel.

5. The touch sensing system of claim 4, the touch controller further configured to perform the mutual capacitance sensing by:

sequentially driving the one or more discrete column electrodes in each of the one or more regions in each of the plurality of columns with the stimulation signal; and in accordance with driving the one or more discrete column electrodes in the particular region of the particular column with the stimulation signal, measuring an AC signal at each of the one or more continuous row electrodes at which stimulated one or more discrete column electrodes of the particular region are situated, each measured AC signal indicative of a mutual capacitance at a touch pixel defined at an intersection of each of measured continuous row electrodes and one of the stimulated one or more discrete column electrodes.

6. The touch sensing system of claim 5, the touch controller further configured to:

in accordance with driving the one or more discrete column electrodes in the particular region of the particular column with the stimulation signal, couple one or more unstimulated discrete column electrodes to a reference voltage.

7. The touch sensing system of claim 5, the touch controller further configured to:

in accordance with the measuring of the AC signal at each of the one or more continuous row electrodes at which the stimulated one or more discrete column electrodes of the particular region are situated, couple one or more unmonitored continuous row electrodes to a reference voltage.

8. The touch sensing system of claim 4, the touch controller further configured to perform the self-capacitance sensing by:

driving one or more of the plurality of continuous row electrodes with the stimulation signal; and in accordance with driving each of the one or more continuous row electrodes with the stimulation signal, measuring an AC signal at each of driven one or more continuous row electrodes, the AC signal measured at each driven continuous row electrode indicative of the self-capacitance at the driven continuous row electrode.

9. The touch sensing system of claim 8, the touch controller further configured to:

in accordance with the measuring of the AC signal at each of the driven one or more continuous row electrodes, couple one or more undriven continuous row electrodes to a reference voltage.

10. The touch sensing system of claim 8, the touch controller further configured to perform the self-capacitance sensing by:

driving the one or more discrete column electrodes in each region of one or more columns with the stimulation signal; and in accordance with driving the one or more discrete column electrodes in each region of the one or more columns with the stimulation signal, measuring an AC signal at driven one or more discrete column electrodes in each region of the one or more columns, the AC signal measured indicative of the self-capacitance at that region.

11. The touch sensing system of claim 10, the touch controller further configured to:

in accordance with the measuring of the AC signal at the driven one or more discrete column electrodes in each region of the one or more columns, coupling one or more undriven discrete column electrodes to a reference voltage.

12. A method for detecting one or more touches occurring at least partially at a same time on a touch sensor panel having a plurality of discrete column electrodes arranged in a plurality of columns and a plurality of continuous row electrodes arranged in a plurality of rows, the method comprising:

performing mutual capacitance touch sensing by:

sequentially driving one or more discrete column electrodes in each of one or more regions in each of the plurality of columns with a stimulation signal, wherein:

each region in a particular column includes one or more of the discrete column electrodes situated in that column, the one or more discrete column electrodes in a particular region are separated by at least one discrete column electrode associated with a different region, and all of the one or more discrete column electrodes in the particular region are electrically connected together, and in accordance with driving the one or more discrete column electrodes in the particular region, that are electrically connected together and separated by the at least one discrete column electrode associated with the different region, with the stimulation signal, measuring an AC signal at each of the one or more continuous row electrodes at which stimulated one or more discrete column electrodes of the particular region are situated, each measured AC signal indicative of a mutual capacitance at a touch pixel defined at an intersection of each of measured continuous row electrodes and one of the stimulated one or more discrete column electrodes; and performing self-capacitance touch sensing by:

driving one or more of the plurality of continuous row electrodes with the stimulation signal, and in accordance with driving the one or more continuous row electrodes with the stimulation signal, measuring an AC signal at each of driven one or more continuous row electrodes, the measured AC signal at each driven continuous row electrode indicative of a self-capacitance at the driven continuous row electrode.

13. The method of claim 12, further comprising performing the mutual capacitance sensing by:

in accordance with driving the one or more discrete column electrodes in the particular region with the stimulation signal, coupling one or more unstimulated discrete column electrodes to a reference voltage.

14. The method of claim 12, further comprising performing the mutual capacitance sensing by:

in accordance with the measuring of the AC signal at each of the one or more continuous row electrodes at which the stimulated one or more discrete column electrodes of the particular region are situated, coupling one or more unmeasured continuous row electrodes to a reference voltage.

15. The method of claim 12, further comprising performing the self-capacitance touch sensing by:

in accordance with the measuring of the AC signal at each of the driven one or more continuous row electrodes, coupling one or more undriven continuous row electrodes to a reference voltage.

16. The method of claim 12, further comprising performing the self-capacitance touch sensing by:

driving the one or more discrete column electrodes in each region of one or more columns with the stimulation signal; and in accordance with driving the one or more discrete column electrodes in each region of the one or more columns with the stimulation signal, measuring an AC signal at driven one or more discrete column electrodes in each region of the one or more columns, the measured AC signal indicative of the self-capacitance at that region.

17. The method of claim 16, further comprising:

in accordance with the measuring of the AC signal at the driven one or more discrete column electrodes in each region of the one or more columns, coupling one or more undriven discrete column electrodes to a reference voltage.

18. A non-transitory computer-readable storage medium storing instructions that, when executed by one or more processors at a touch sensing device including a touch sensor panel, causes the one or more processors to perform a method for detecting one or more touches occurring at least partially at a same time on the touch sensor panel having a plurality of discrete column electrodes arranged in a plurality of columns and a plurality of continuous row electrodes arranged in a plurality of rows, the method comprising:

performing mutual capacitance touch sensing by:

sequentially driving one or more discrete column electrodes in each of one or more regions in each of the plurality of columns with a stimulation signal, wherein:

each region in a particular column includes one or more of the discrete column electrodes situated in that column, the one or more discrete column electrodes in a particular region are separated by at least one discrete column electrode associated with a different region, and all of the one or more discrete column electrodes in the particular region are electrically connected together, and in accordance with driving the one or more discrete column electrodes in the particular region, that are electrically connected together and separated by the at least one discrete column electrode associated with the different region, with the stimulation signal, measuring an AC signal at each of the one or more continuous row electrodes at which stimulated one or more discrete column electrodes of the particular region are situated, each measured AC signal indicative of a mutual capacitance at a touch pixel defined at an intersection of each of measured continuous row electrodes and one of the stimulated one or more discrete column electrodes; and performing self-capacitance touch sensing by:

driving one or more of the plurality of continuous row electrodes with a stimulation signal, and in accordance with driving the one or more continuous row electrodes with the stimulation signal, measuring an AC signal at each of driven one or more continuous row electrodes, the measured AC signal at each driven continuous row electrode indicative of a self-capacitance at the driven continuous row electrode.

19. The non-transitory computer-readable storage medium of claim 18, storing instructions which, when executed by the one or more processors, further causes the one or more processors to:

drive the one or more discrete column electrodes in each region of one or more columns with the stimulation signal; and in accordance with driving the one or more discrete column electrodes in each region of the one or more columns with the stimulation signal, measure an AC signal at driven one or more discrete column electrodes in each region of the one or more columns, the measured AC signal indicative of the self-capacitance at that region.

* * * * *